(12) United States Patent
Price et al.

(10) Patent No.: US 11,579,449 B2
(45) Date of Patent: Feb. 14, 2023

(54) SYSTEMS AND METHODS FOR PROVIDING MIXED-REALITY EXPERIENCES UNDER LOW LIGHT CONDITIONS

(71) Applicant: Microsoft Technology Licensing, LLC, Redmond, WA (US)

(72) Inventors: Raymond Kirk Price, Redmond, WA (US); Christopher Douglas Edmonds, Carnation, WA (US); Michael Bleyer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 121 days.

(21) Appl. No.: 16/887,737

(22) Filed: May 29, 2020

(65) Prior Publication Data

US 2021/0373336 A1 Dec. 2, 2021

(51) Int. Cl.
*G02B 27/01* (2006.01)
*G06T 7/579* (2017.01)
(Continued)

(52) U.S. Cl.
CPC ..... *G02B 27/0172* (2013.01); *G02B 27/0093* (2013.01); *G02B 27/0101* (2013.01); *G06T 7/579* (2017.01); *G06T 19/006* (2013.01); *G02B 2027/0138* (2013.01); *G06T 2207/10012* (2013.01); *G06T 2207/10048* (2013.01)

(58) Field of Classification Search
CPC ............ G02B 27/0172; G02B 27/0093; G02B 27/0101; G02B 2027/0138; G02B 2027/0134; G02B 2027/014; G02B 2027/0187; G02B 27/017; G06T 7/579; G06T 19/006; G06T 2207/10012; G06T 2207/10048; G06F 3/011; G06F 3/012
See application file for complete search history.

(56) References Cited

U.S. PATENT DOCUMENTS

2002/0172514 A1* 11/2002 Gabello ................ G01S 17/32
396/109
2012/0236425 A1* 9/2012 O'Neill ................ G02B 7/002
359/827

(Continued)

OTHER PUBLICATIONS

"International Search Report and Written Opinion Issued in PCT Application No. PCT/US2021/019318", dated Jun. 11, 2021, 26 Pages.

*Primary Examiner* — Ram A Mistry
(74) *Attorney, Agent, or Firm* — Workman Nydegger

(57) ABSTRACT

Systems and methods are provided for facilitating computer vision tasks (e.g., simultaneous location and mapping) and pass-through imaging include a head-mounted display (HMD) that includes a first set of one or more cameras configured for performing computer vision tasks and a second set of one or more cameras configured for capturing image data of an environment for projection to a user of the HMD. The first set of one or more cameras is configured to detect at least a visible spectrum light and at least a particular band of wavelengths of infrared (IR) light. The second set of one or more cameras includes one or more detachable IR filters configured to attenuate IR light, including at least a portion of the particular band of wavelengths of IR light.

17 Claims, 11 Drawing Sheets

(51) Int. Cl.
   *G02B 27/00*    (2006.01)
   *G06T 19/00*    (2011.01)

(56) References Cited

U.S. PATENT DOCUMENTS

2012/0326948 A1    12/2012  Crocco
2018/0122143 A1*    5/2018  Ellwood, Jr. ............ H04N 9/31
2019/0258058 A1*    8/2019  Fortin-Desch .......... G06F 3/011

* cited by examiner

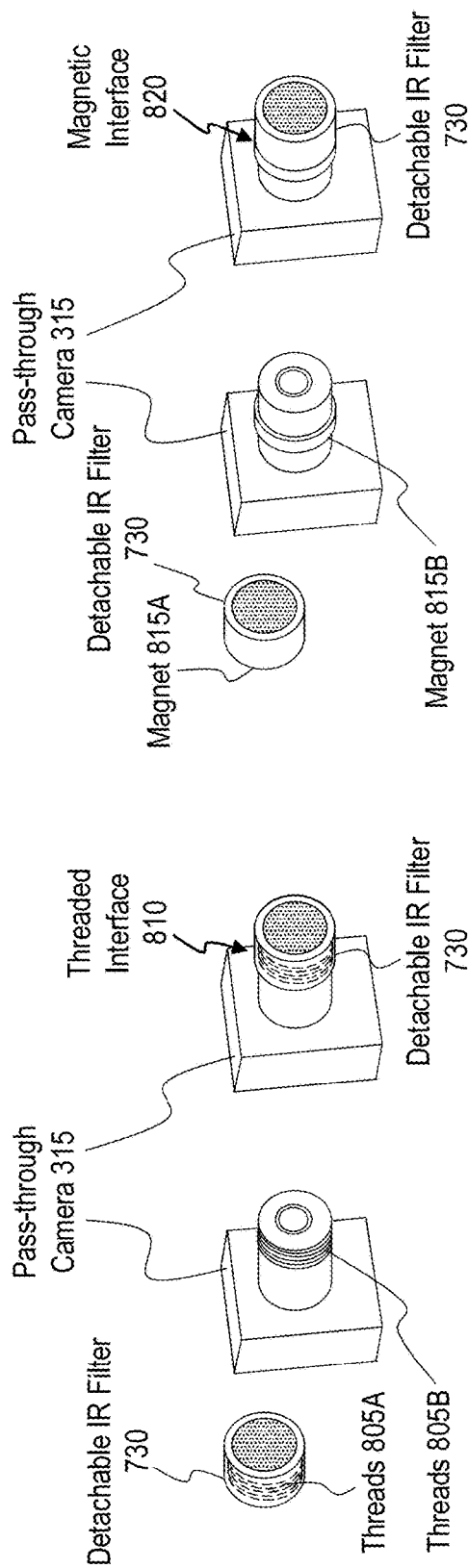
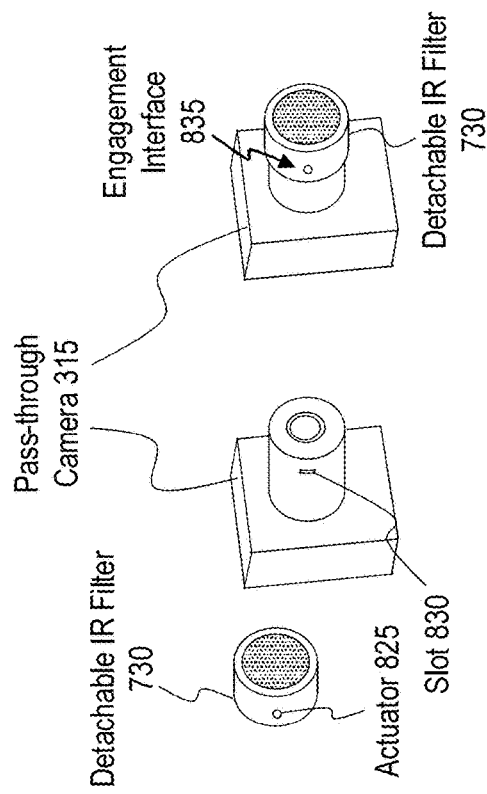
*Figure 8A*
*Figure 8B*
*Figure 8C*

SYSTEMS AND METHODS FOR PROVIDING MIXED-REALITY EXPERIENCES UNDER LOW LIGHT CONDITIONS

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Many MR systems include one or more sensors configured for performing computer vision tasks. For example, some MR systems include one or more environment-facing cameras used for performing pose detection. MR systems often rely on pose data to accurately display virtual content (e.g., holograms) within a mixed-reality environment with respect to the perspective of the viewer (e.g., the user of the MR system).

MR systems often include one or more sensors configured for performing image capture tasks. For example, some MR systems include one or more environment-facing cameras used for capturing video frames of a user's environment and/or for providing a pass-through view of the user's environment. In some instances, an MR system includes stereo cameras of various modalities to provide parallax-corrected pass-through views of a user's environment that enhance the user's understanding of their real-world environment. For example, an MR system that includes long wavelength thermal imaging cameras may allow a user (e.g., a first responder) to see through smoke, haze, fog, and/or dust. In another example, an MR system that includes low light imaging cameras may allow a user (e.g., a first responder) to see in low light environments where the ambient light level is below the level required for human vision.

In some instances, the sensor(s) of an MR system for performing computer vision tasks and the sensor(s) of an MR system for performing image capture tasks are configured to operate under different environment lighting conditions. In such circumstances, and particularly in low light conditions, it has been found that the sensors of existing MR systems fail to achieve acceptable performance for both computer vision tasks and image capture tasks.

By way of example, in some instances, although a low light camera of an MR system may capture images of an environment under low light conditions (e.g., at about or below 10 lux for a typical commercial low light camera), a pose detection camera system of an MR system may fail for accurately detecting pose data under low light conditions (e.g., at about or below 10 lux for a typical commercial low light camera). Accordingly, performing computer vision tasks (such as pose detection) while performing image capture tasks (e.g., providing parallax-corrected pass-through images) under low light conditions is associated with many challenges.

For at least the foregoing reasons, there is an ongoing need and desire for techniques and systems for performing computer vision tasks and image capture tasks under the same environment lighting conditions (e.g., low light conditions), particularly for providing mixed-reality experiences under low light conditions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for providing mixed-reality experiences under low light conditions. At least some of the disclosed embodiments are directed to facilitating computer vision tasks (e.g., head tracking) and pass-through imaging.

Some embodiments include MR systems, such as a head-mounted display (HMD), comprising a first set of one or more cameras configured for performing computer vision tasks and a second set of one or more cameras configured for capturing image data of an environment for projection to a user of the HMD. In some implementations, the first set of one or more cameras is configured to detect at least a visible spectrum light and at least a particular band of wavelengths of infrared (IR) light and the second set of one or more cameras includes one or more detachable IR filters configured to attenuate IR light, including at least a portion of the particular band of wavelengths of IR light.

Some disclosed embodiments include methods implemented by one or more HMD and/or MR systems for facilitating computer vision tasks and pass-through imaging. These methods include, in some instances, the implementation of various acts, including at least an act of capturing, with a first set of one or more cameras, a first set of one or more images for performing a computer vision task. This first set of one or more cameras, in some instances, is configured to detect at least a visible spectrum light and at least a particular band of wavelengths of infrared (IR) light, and the first set of one or more images is captured with at least some of the particular band of wavelengths of IR light that is reflected in an environment.

In some instances, the disclosed method acts also include capturing, with a second set of one or more cameras, a second set of one or more images, wherein the second set of one or more cameras is configured for capturing image data of the environment for projection to a user of a head-mounted display (HMD). Furthermore, in some instances, the second set of one or more cameras comprise one or more detachable IR filters configured to attenuate IR light, including at least a portion of the particular band of wavelengths of IR light, such that the second set of one or more images omit attenuated IR light, which is attenuated by the one or more detachable IR filters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 8A-8E illustrate example detachable IR filters for sensors configured for performing image capture tasks;

DETAILED DESCRIPTION

Figure 1:
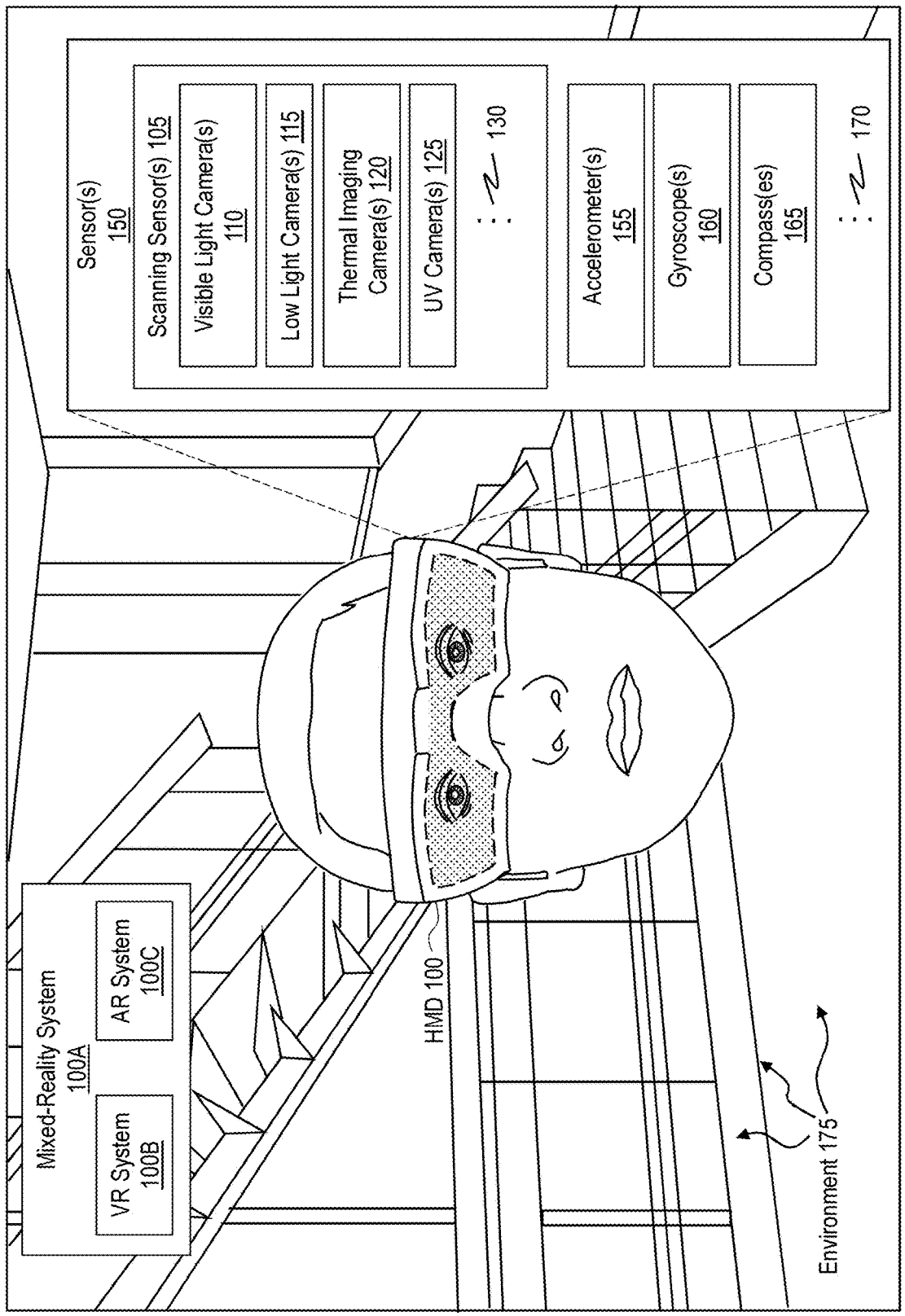
FIG. 1 illustrates an example mixed-reality system that may include or be used to implement disclosed embodiments.

Disclosed embodiments include systems and methods for providing mixed-reality experiences under low light conditions. For example, at least some of the disclosed embodiments are directed to facilitating computer vision tasks (e.g., head tracking) and pass-through imaging.

Some disclosed embodiments include a system comprising a head-mounted display with a first set of one or more cameras and a second set of one or more cameras. The first set of cameras is configured for performing computer vision tasks and the second set of cameras is configured for capturing image data of an environment for projection to a user of the HMD. In some implementations, the first set of one or more cameras is configured to detect at least a visible spectrum light and at least a particular band of wavelengths of infrared (IR) light. Furthermore, in some implementations, the second set of one or more cameras includes one or more detachable IR filters configured to attenuate IR light, including at least a portion of the particular band of wavelengths of IR light.

Examples of Technical Benefits, Improvements, and Practical Applications

Those skilled in the art will recognize, in view of the present disclosure, that at least some of the disclosed embodiments may address various shortcomings associated with providing mixed-reality experiences under low light conditions. The following section outlines some example improvements and/or practical applications provided by the disclosed embodiments. It will be appreciated, however, that the following are examples only and that the embodiments described herein are in no way limited to the example improvements discussed herein.

In some implementations, providing a system that includes cameras that are configured to detect visible spectrum light and infrared (IR) light for performing computer vision tasks may enable and/or enhance the performance of the computer vision tasks under IR-illuminated conditions. Furthermore, providing the system with cameras that filter out IR light for performing image capture tasks facilitates performance of image capture tasks under the same IR-illuminated conditions, without the captured images being affected by the IR illumination within the IR-illuminated environment. Such embodiments represent technical improvements over existing systems that are unable to utilize IR illumination to enhance computer vision tasks while also performing image capture tasks that are not negatively affected by IR illumination.

For example, an MR system may include pose detection cameras (e.g., simultaneous location and mapping, also known as head tracking cameras) that are configured to perform pose detection (e.g., head tracking) under IR-illuminated low light conditions. The MR system may also include low light cameras that are configured to filter out the IR illumination and capture low light image data for providing pass-through views of a user's environment (e.g., thereby preventing the low light image data being affected by the IR illumination). In this regard, at least some of the disclosed embodiments may enable a system to provide mixed-reality experiences under low light conditions (e.g., IR-illuminated low light conditions) that include accurate pose detection (e.g., for accurately displaying world-locked holograms) and realistic low light pass-through images of the environment (e.g., parallax-corrected low light pass-through images).

As used herein, "world-locked holograms" refers to virtual content displayed to a user relative to real-world physical objects detected within a real-world environment (or virtual representations of real-world physical objects detected within a real-world environment), such as, for example, a hologram of a figurine displayed standing on a real-world physical table.

One will appreciate, in view of the present disclosure, that the principles described herein may enhance mixed-reality gaming experiences for users by providing systems that have the ability to accurately present world-locked holograms and/or provide parallax-corrected pass-through views under low-light environments (e.g., in addition to lighted environments).

Furthermore, the principles described herein may facilitate training experiences for emergency response personnel, such as first responders, under low light conditions. In addition, in some implementations, the IR filters of the low light cameras are selectively detachable therefrom, which may enable users to readily configure an MR system for training experiences (e.g., under IR-illuminated conditions) and non-training experiences (e.g., without IR illumination).

Although the present description focuses, in some respects, on low light conditions and IR-illuminated low light conditions, those skilled in the art will appreciate, in view of the present disclosure, that the principles disclosed herein are not limited to low light conditions and may be applied under different lighting conditions (e.g., any IR-illuminated environment such as a visible-lighted environment with supplemental IR illumination).

Furthermore, although the present description focuses, in some respects, on certain computer vision tasks (e.g., pose detection or head tracking) and/or certain image capture tasks (e.g., capturing image data for providing pass-through views), those skilled in the art will recognize, in view of the present disclosure, that the principles disclosed herein may be applied to other computer vision tasks (e.g., event detection, automatic inspection, process control, interaction detection, navigation, modeling, semantic segmentation, instance segmentation, object localization, image classification, object/marker detection (e.g., QR code scanning), image captioning, etc.) and/or image capture tasks (e.g., still image capture, video capture, etc.).

Having just described some of the various high-level features and benefits of the disclosed embodiments, attention will now be directed to FIGS. 2 through 9. These Figures illustrate various conceptual representations, architectures, methods, and supporting illustrations related to providing mixed-reality experiences under low light conditions. The disclosure will then turn to FIG. 10, which presents an example computer system that may include and/or be used to facilitate the disclosed principles.

Example Mixed-Reality Systems and HMDs

Attention will now be directed to FIG. 1, which illustrates an example of a head-mounted device (HMD) 100. HMD 100 can be any type of mixed-reality system 100A (MR system), including a VR system 100B or an AR system 100C. It should be noted that while a substantial portion of this disclosure is focused, in some respects, on the use of an HMD, the embodiments are not limited to being practiced using only an HMD. That is, any type of system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

FIG. 1 illustrates HMD 100 as including sensor(s) 150, including scanning sensor(s) 105 and other sensors, such as accelerometer(s) 155, gyroscope(s) 160, compass(es) 165. The ellipsis 170 conveys that the sensor(s) 150 depicted in FIG. 1 are illustrative only and non-limiting. For instance, in some implementations, an HMD 100 includes other interoceptive and/or exteroceptive sensors not explicitly illustrated in FIG. 1, such as eye tracking systems, radio-based navigation systems, microphones, and/or other sensing apparatuses.

The accelerometer(s) 155, gyroscope(s) 160, and compass(es) 165 are configured to measure inertial tracking data. Specifically, the accelerometer(s) 155 is/are configured to measure acceleration, the gyroscope(s) 160 is/are configured to measure angular velocity data, and the compass(es) 165 is/are configured to measure heading data. In some instances, an HMD 100 utilizes the inertial tracking components thereof to obtain three degree of freedom (3DOF) pose data associated with the HMD (e.g., where visual tracking data, described below, is unavailable or unreliable). As used herein, 3DOF refers to position (e.g., rotation) information associated with rotational axes about three perpendicular directional axes (e.g., pitch, yaw, and roll).

The inertial tracking components of the HMD 100 (i.e., the accelerometer(s) 155, gyroscope(s) 160, and compass(es) 165) may operate in concert with a visual tracking system to form a head tracking system that generates pose data for the HMD 100. In some instances, a visual tracking system includes one or more cameras (e.g., head tracking cameras) that capture image data of an environment (e.g., environment 175). In some instances, the HMD 100 obtains visual tracking data based on the images captured by the visual tracking system, such as feature points within the environment that may provide an anchor for determining movement of the HMD 100 relative to the environment.

For example, visual-inertial Simultaneous Location and Mapping (SLAM) in an HMD 100 fuses (e.g., with a pose filter) visual tracking data obtained by one or more cameras (e.g., head tracking cameras) with inertial tracking data obtained by the accelerometer(s) 155, gyroscope(s) 160, and compass(es) 165 to estimate six degree of freedom (6DOF) positioning (i.e., pose) of the HMD 100 in space and in real time. 6DOF refers to positioning/velocity information associated with three perpendicular directional axes and the three rotational axes (often referred to as pitch, yaw, and roll) about each of the three perpendicular directional axes (often referred to as x, y, and z).

The visual tracking system of an HMD 100, in some instances, includes a stereo pair of head tracking images that is configured to obtain depth maps of the user's environment (e.g., environment 175) to provide visual mapping of the user's environment (e.g., by maintaining a surface mesh of the environment, or any other 3D representation of the environment). The HMD 100 may utilize the visual mapping data of the environment to accurately display virtual content with respect to the user's environment. Visual mapping data may also enable location sharing between users in a shared mixed-reality environment.

In some instances, the visual tracking system(s) of an HMD 100 (e.g., head tracking cameras) is/are implemented as one or more dedicated cameras. In other instances, the visual tracking system(s) is/are implemented as part of a camera system that performs other functions (e.g., as part of one or more cameras of the scanning sensor(s) 105, described hereinbelow).

The scanning sensor(s) 105 comprise any type of scanning or camera system, and the HMD 100 can employ the scanning sensor(s) 105 to scan environments, map environments, capture environmental data, and/or generate any kind of images of the environment. For example, in some instances, the HMD 100 is configured to generate a 3D representation of the real-world environment or generate a "passthrough" visualization. Scanning sensor(s) 105 may comprise any number or any type of scanning devices, without limit.

In accordance with the disclosed embodiments, the HMD 100 may be used to generate a parallax-corrected passthrough visualization of the user's environment. A "passthrough" visualization refers to a visualization that reflects what the user would see if the user were not wearing the HMD 100, regardless of whether the HMD 100 is included as a part of an AR system or a VR system. To generate this passthrough visualization, the HMD 100 may use its scanning sensor(s) 105 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique. As the camera modules are not telecentric with the user's eyes, this perspective difference will need to be corrected.

To convert a raw image into a passthrough image, the scanning sensor(s) 105 typically rely on its cameras (e.g., visible light camera(s) 110, low light camera(s) 115, thermal imaging camera(s) 120, UV camera(s), or any other type of camera) to obtain one or more raw images of the environment (e.g., environment 175). In some instances, in addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images, and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 100. Furthermore, as will be described in more detail later, the disclosed passthrough visualizations may also enhance the user's ability to view objects within his/her environment (e.g., by displaying additional environmental conditions that may not have been detectable by a human eye).

It should be noted that while a portion of this disclosure focuses on generating "a" passthrough image, the implementations described herein may generate a separate passthrough image for each one of the user's eyes. That is, two passthrough images are typically generated concurrently with one another. Therefore, while frequent reference is made to generating what seems to be a single passthrough image, the implementations described herein are actually able to simultaneously generate multiple passthrough images.

In some embodiments, scanning sensor(s) 105 include visible light camera(s) 110, low light camera(s) 115, thermal imaging camera(s) 120, and potentially (though not necessarily) ultraviolet (UV) cameras 125, or Near Infrared (NIR) Cameras (in the 800 nm to 2 um range). The ellipsis 130 demonstrates how any other type of camera or camera system (e.g., depth cameras, time of flight cameras, etc.) may be included among the scanning sensor(s) 105. As an example, a camera structured to detect mid-infrared wavelengths may be included within the scanning sensor(s) 105.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 110 include red, green, blue (RGB) cameras structured to capture light within the visible spectrum. Often, these RGB cameras are complementary metal-oxide-semiconductor (CMOS) type cameras, though other camera types may be used as well (e.g., charge coupled devices, CCD).

The RGB cameras may be implemented as stereoscopic cameras, meaning that the fields of view of the two or more RGB cameras at least partially overlap with one another. With this overlapping region, images generated by the visible light camera(s) 110 can be used to identify disparities between certain pixels that commonly represent an object captured by both images. Disparities are measured after applying rectification to the stereo pair of images such that corresponding pixels in the images that commonly represent an object in the environment are aligned along scanlines. After rectification, corresponding pixels in the different images that commonly represent an object in the environment only differ in one dimension (e.g., the direction of the scanlines, such as the horizontal direction). The one-dimensional difference between corresponding pixels in their respective images of the stereo pair of images represents the disparity value for the object represented by the corresponding pixels.

Based on these pixel disparities, the embodiments are able to determine depths for objects located within the overlapping region (i.e. "stereoscopic depth matching," "stereo depth matching," or simply "stereo matching"). As such, the visible light camera(s) 110 can be used to not only generate passthrough visualizations, but they can also be used to determine object depth. In some embodiments, the visible light camera(s) 110 can capture both visible light and IR light.

Those skilled in the art will recognize, in view of the present disclosure, that stereo matching may be performed on a stereo pair of images obtained by any type and/or combination of cameras. For example, an HMD 100 or other system may comprise any combination of visible light camera(s) 110, low light camera(s) 115, thermal imaging camera(s) 120, UV camera(s) 125, Near Infrared Red, and/or other cameras to capture a stereo pair of images upon which to perform stereo matching (e.g., for the overlapping region of the stereo pair of images).

In some instances, the low light camera(s) 115 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. In some instances, the low light camera(s) 115 are structured to detect or be sensitive to IR light in at least the near-IR range.

One distinguishing feature between the visible light camera(s) 110 and the low light camera(s) 115 is related to the illuminance conditions or illuminance range(s) in which they actively operate. In some cases, the visible light camera(s) 110 are low power cameras and operate in environments where the illuminance is between about 10 lux and about 100,000 lux (e.g., for an example commercial visible light camera), or rather, the illuminance range begins at about 10 lux and increases beyond 10 lux. In contrast, the low light camera(s) 115 consume more power and operate in environments where the illuminance range is between overcast starlight and dusk lighting levels. In some instances, the device operates in environments between about 1 milli-lux and about 10 lux (e.g., for a typical commercial low light camera).

The thermal imaging camera(s) 120, in some instances, are structured to detect electromagnetic radiation or IR light in the far-IR (i.e. thermal-IR) range, though some implementations also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns. Because the thermal imaging camera(s) 120 detect far-IR radiation, the thermal imaging camera(s) 120 can operate, in some instances, in any illuminance condition.

In some cases (though not necessarily all), the thermal imaging camera(s) 120 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 125 are structured to capture light in the UV range. The UV range includes electromagnetic radiation having wavelengths between about 10 nm and about 400 nm. The disclosed UV camera(s) 125 should be interpreted broadly and may be operated in a manner that includes both reflected UV photography and UV induced fluorescence photography.

In some instances, visible light cameras are cameras that are used for computer vision to perform head tracking (e.g., as described hereinabove). These cameras can detect visible light, or even a combination of visible and IR light (e.g., a range of IR light). In some cases, these cameras are global shutter devices with pixels being about 3 µm in size.

Low light cameras, in some instances, are cameras that are sensitive to visible light and near-IR. These cameras are larger and may have pixels that are about 5 µm in size or larger. These cameras are also sensitive to wavelengths that silicon sensors are sensitive to, which wavelengths are between about 350 nm to 1100 nm.

In some implementations, thermal/long wavelength IR devices (i.e. thermal imaging cameras) have pixel sizes that are about 10 µm or larger and detect heat radiated from the environment. These cameras may be sensitive to wavelengths in the 8 µm to 14 µm range. Some embodiments also include mid-IR cameras configured to detect at least mid-IR light. These cameras often comprise non-silicon materials (e.g., InP or InGaAs) that detect light in the 800 nm to 2 µm wavelength range.

Generally, the low light camera(s) 115, the thermal imaging camera(s) 120, and the UV camera(s) 125 (if present) consume relatively more power than the visible light camera(s) 110. Therefore, when not in use, the low light camera(s) 115, the thermal imaging camera(s) 120, and/or the UV camera(s) 125 are typically in the powered-down state in which those cameras are either turned off (and thus consuming no power) or in a reduced operability mode (and thus consuming substantially less power than if those cameras were fully operational). In contrast, the visible light camera(s) 110 are typically in the powered-up state in which those cameras are by default fully operational.

It should be noted that any number of cameras may be provided on the HMD 100 for each of the different camera types. That is, the visible light camera(s) 110 may include 1, 2, 3, 4, 5, 6, 7, 8, 9, 10, or more than 10 cameras. Often, however, the number of cameras is at least 2 so the HMD 100 can perform stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
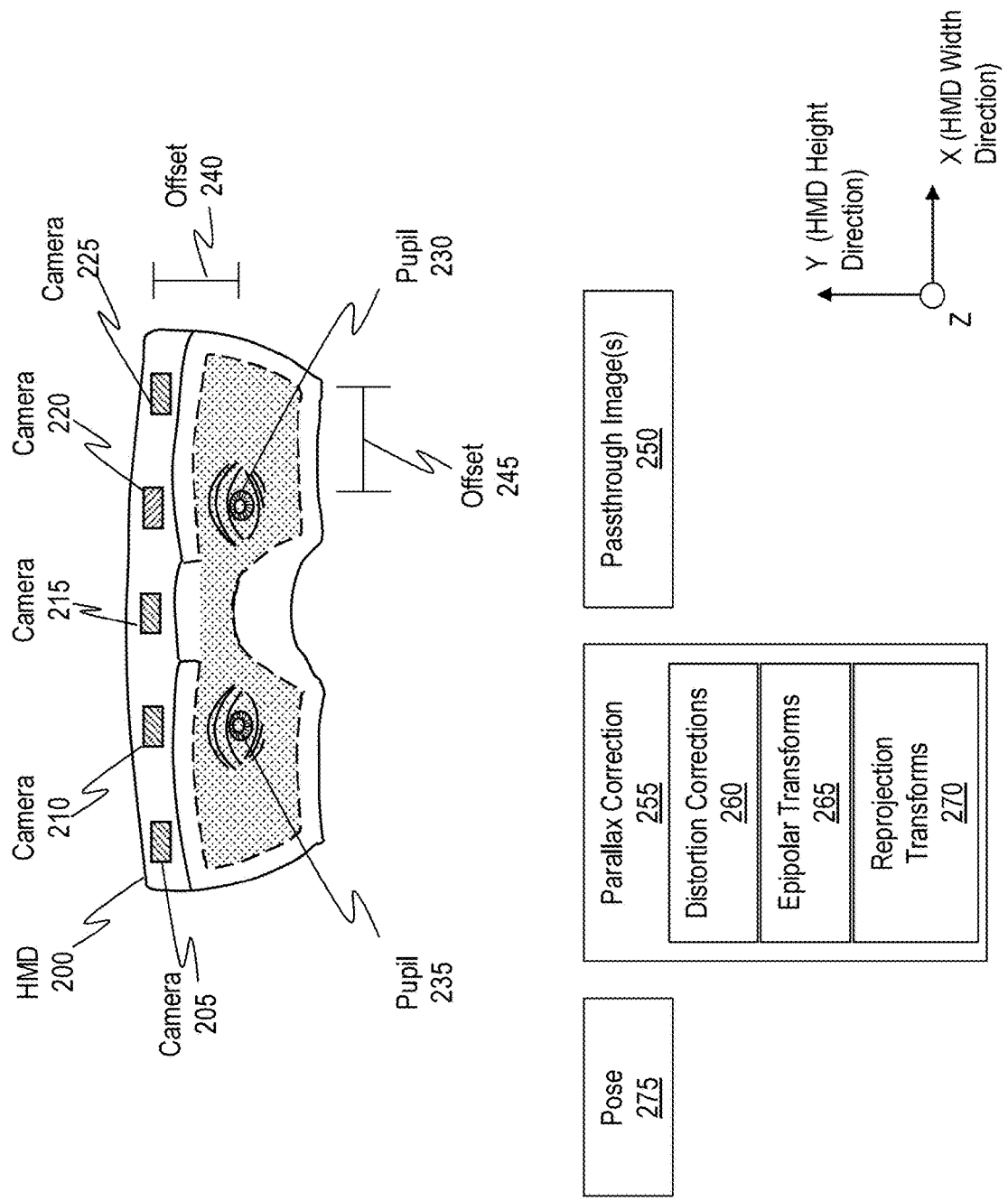
FIG. 2 illustrates example structural configurations of components of an example mixed-reality system, as well as an example of a parallax correction operation.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or fewer than 5 cameras.

In some cases, the cameras can be located at specific positions on the HMD 200. For instance, in some cases a first camera (e.g., perhaps camera 220) is disposed on the HMD 200 at a position above a designated left eye position of any users who wear the HMD 200 relative to a height direction of the HMD. For instance, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. For example, with reference to FIG. 2, a camera may be physically disposed on the HMD 200 at a position in front of the pupil 230 in the z-axis direction.

When a second camera is provided (e.g., perhaps camera 210), the second camera may be disposed on the HMD at a position above a designated right eye position of any users who wear the HMD relative to the height direction of the HMD. For instance, the camera 210 is above the pupil 235. In some cases, the second camera is additionally positioned above the designated right eye position relative to the width direction of the HMD. When a VR system is used, a camera may be placed directly in front of the designated right eye position. For example, with reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240 (representing the vertical offset between a user's eye and camera 225). Similarly, there may be a horizontal offset in the HMD width direction (i.e. the "X" axis), as shown by offset 245 (representing the horizontal offset between a user's eye and camera 225). Each camera may be associated with a different offset.

As described earlier, HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the same view the user would see if the user were not wearing HMD 200. In some instances, the HMD 200 employs at least some of cameras 205-225 to provide these passthrough image(s) 250. It will be appreciated that the passthrough images will have various levels of processing performed on the sensors, including denoising, tone mapping, and other processing steps to make high quality imagery. Additionally, camera reprojection steps (e.g., parallax correction) may or may not be performed, as well, to correct for the offset between the user's perspective and the camera position.

None of the cameras 205-225, however, are directly aligned with the pupils 230 and 235. The offsets 240 and 245 actually introduce differences in perspective as between the cameras 205-225 and the pupils 230 and 235. These perspective differences are referred to as "parallax."

Because of the parallax occurring as a result of the offsets 240 and 245, raw images produced by the cameras 205-225 are not available for immediate use as passthrough image(s) 250. Instead, it is beneficial to perform a parallax correction 255 (aka an image synthesis or reprojection) on the raw images to transform (or reproject) the perspectives embodied within those raw images to correspond to perspectives of the user's pupils 230 and 235. The parallax correction 255 includes any number of distortion corrections 260 (e.g., to correct for concave or convex wide or narrow angled camera lenses), epipolar transforms 265 (e.g., to parallelize the optical axes of the cameras), and/or reprojection transforms 270 (e.g., to reposition the optical axes so as to be essentially in front of or in-line with the user's pupils).

The parallax correction 255 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current pose 275 of the HMD 200 relative to its surrounding environment (e.g., as determined via visual-inertial SLAM). Based on the pose 275 and the depth maps that are generated, the HMD 200 and/or other system is/are able to correct parallax error by reprojecting a perspective embodied by the raw images to coincide with a perspective of the user's pupils 230 and 235.

By performing these different transforms, the HMD 200 is able to perform three-dimensional (3D) geometric transforms on the raw camera images to transform the perspectives of the raw images in a manner so as to correlate with the perspectives of the user's pupils 230 and 235. Additionally, the 3D geometric transforms rely on depth computations in which the objects in the HMD 200's environment are mapped out to determine their depths as well as the pose 275. Based on these depth computations and pose 275, the HMD 200 is able to three-dimensionally reproject or three-dimensionally warp the raw images in such a way so as to preserve the appearance of object depth in the passthrough image(s) 250, where the preserved object depth substantially matches, corresponds, or visualizes the actual depth of objects in the real world. Accordingly, the degree or amount of the parallax correction 255 is at least partially dependent on the degree or amount of the offsets 240 and 245.

By performing the parallax correction 255, the HMD 200 effectively creates "virtual" cameras having positions that are in front of the user's pupils 230 and 235. By way of additional clarification, consider the position of camera 205, which is currently above and to the left of pupil 235. By performing the parallax correction 255, the embodiments programmatically transform images generated by camera 205, or rather the perspectives of those images, so the perspectives appear as though camera 205 were actually positioned immediately in front of pupil 235. That is, even though camera 205 does not actually move, the embodiments are able to transform images generated by camera 205 so those images have the appearance as if camera 205 was coaxially aligned with pupil 235 and, in some instances, at the exact position of pupil 235.

Although the present disclosure focuses, in some respects, on image capture tasks related to capturing image data for generating parallax-corrected pass-through views of an environment, it should be noted that at least some of the principles described herein are applicable to any implementation that involves any type of image capture task, such as still frame capture, video capture, etc.

Providing Mixed-Reality Experiences Under Low Light Conditions

Figure 3:
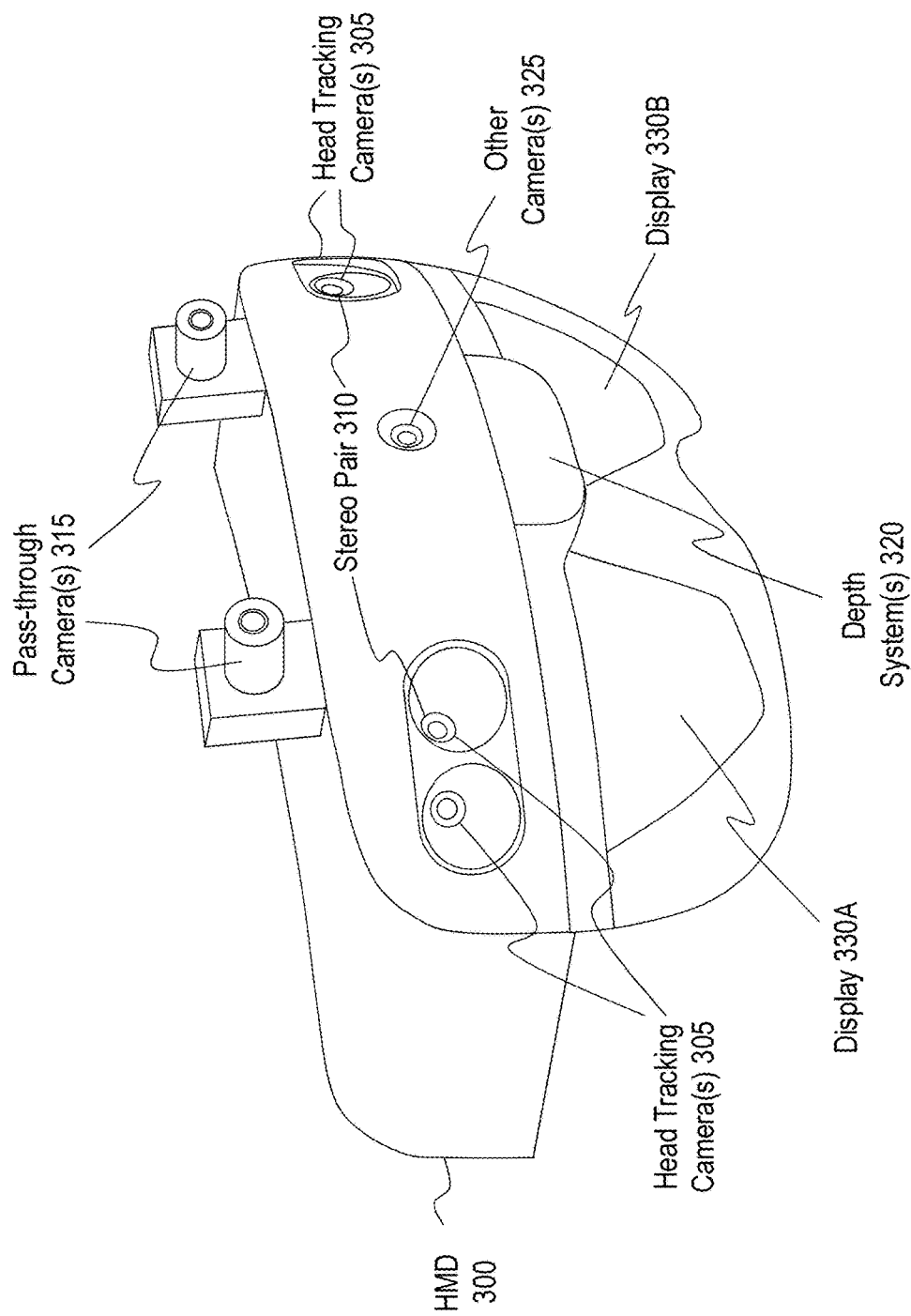
FIG. 3 illustrates an example of a head-mounted display (HMD) with sensors for performing computer vision tasks and sensors for performing image capture tasks.

Attention is now directed to FIG. 3, which illustrates an example of an HMD 300 with sensors for performing computer vision tasks (e.g., head tracking, or other simultaneous location and mapping functions) and sensors for performing image capture tasks (e.g., capturing images for pass-through imaging). HMD 300 is analogous to HMD 100 as described hereinabove with reference to FIG. 1. FIG. 3 illustrates an implementation in which the HMD 300 includes a set of head tracking cameras 305 implemented as visible light cameras (e.g., visible light camera(s) 110 described hereinabove with reference to FIG. 1) and a set of pass-through cameras 315 implemented as low light cameras (e.g., low light camera(s) 115 described hereinabove with reference to FIG. 1).

FIG. 3 also illustrates that, in some instances, the HMD 300 includes other sensors, such as depth system(s) 320 and other camera(s) 325 that may be configured to perform a same or different set of image capture functions than those performed by cameras 305 and 315. The other cameras and sensors may, for example, enable additionally functionality for mixed-reality experiences provided by the HMD 300, such as hand tracking, video capture, etc.

The head tracking cameras 305 (or any other similar cameras configured to perform simultaneous location and mapping) are configured to capture image data of an environment to facilitate, in some instances, head tracking. For example, in some instances, the images captured by the head tracking cameras 305 provide visual tracking data that are used in conjunction with inertial tracking data (e.g., obtained by accelerometer(s) 155, gyroscope(s) 160, compass(es) 165) to determine 6DOF pose data for the HMD 300, as described hereinabove. Furthermore, FIG. 3 shows that the HMD 300 may also include a stereo pair 310 of head tracking cameras 305 to facilitate visual mapping of the environment (e.g., for maintaining a 3D representation of the environment, for user location identification and/or sharing, etc.). Thus, the head tracking cameras 305 may operate in concert with other components of the HMD 300 to enable the HMD 300 to display world-locked holograms (e.g., on displays 330A, 330B) based on the perspective of a user of the HMD 300 and with respect to the environment. Although the HMD 300 includes four head tracking cameras 305, other configurations are within the scope of this disclosure, as noted above.

The set of pass-through cameras 315 of the HMD 300 is configured for capturing human consumable images of the environment, such as, for example, to be displayed/projected to one or more users. FIGS. 3, 4, 6, and 7 focus on implementations in which the pass-through cameras 315 are implemented as low light cameras. However, the pass-through cameras 315 may be implemented in various embodiments as other types of cameras.

According to the implementation shown in FIG. 3, the pass-through cameras 315 of the HMD 300 are provided as a stereo pair of low light cameras. In some instances, each of the pass-through cameras 315 are substantially aligned (e.g., in the x dimension of FIG. 2) with a corresponding user's eye, which may reduce the transformations necessary to perform parallax corrections on the image data captured by the pass-through cameras 315. In other embodiments, the cameras 315 are offset from the user's eyes, and the aforementioned transformations are performed to accomplish the parallax corrections described above.

In some embodiments, the HMD 300 identifies environment texture information based on a stereo pair of images captured by the pass-through cameras 315. In some instances, the stereo pair of images includes a left image and a right image. In some instances, the HMD 300 also generates a depth map of the environment by performing stereo matching on a stereo pair of images captured by the pass-through cameras 315 (e.g., after rectifying the images).

A separate depth map is generated, in some instances, for the geometry of each of the pass-through cameras 315, thereby generating a corresponding pair of depth maps. For example, objects represented in a left depth map may be aligned with the same objects represented in a left image of the stereo pair of images, and, similarly, objects represented in a right depth map may be aligned with the same objects represented in a right image of the stereo pair of images. Accordingly, in some implementations, the HMD 300 generates per-eye parallax-corrected pass-through images. For example, the HMD 300 may utilize a right depth map and a right image to generate a right parallax-corrected pass-through image for display on the right display 330A, and the HMD 300 may utilize and a left depth map and a left image to generate a left parallax-corrected pass-through image for display on the left display 330B.

Thus, in some implementations, the HMD 300 is configured to provide 6DOF pose tracking of the HMD 300 for accurately presenting world-locked holograms on the displays 330A, 330B with respect to user perspective and with respect to objects in the environment (or virtual representations thereof). Also, in some instances, the HMD 300 is configured to provide parallax-corrected low light pass-through views of the environment. Furthermore, in some implementations, the HMD 300 is configured to simultaneously display world-locked holograms and low light pass-through images of the environment on the displays 330A, 330B thereof. For instance, the HMD 300 may implement simultaneous world-locked hologram display and pass-through imaging display to provide mixed-reality gaming and/or training experiences.

As suggested above, there are many challenges associated with concurrently performing head tracking to accurately display world-locked holograms, while also providing pass-through images on a display within a mixed-reality experience, particularly in disparate and under low light conditions. Such a scenario will be described in more detail, below, with reference to the example environment shown in FIG. 4.

Figure 4:
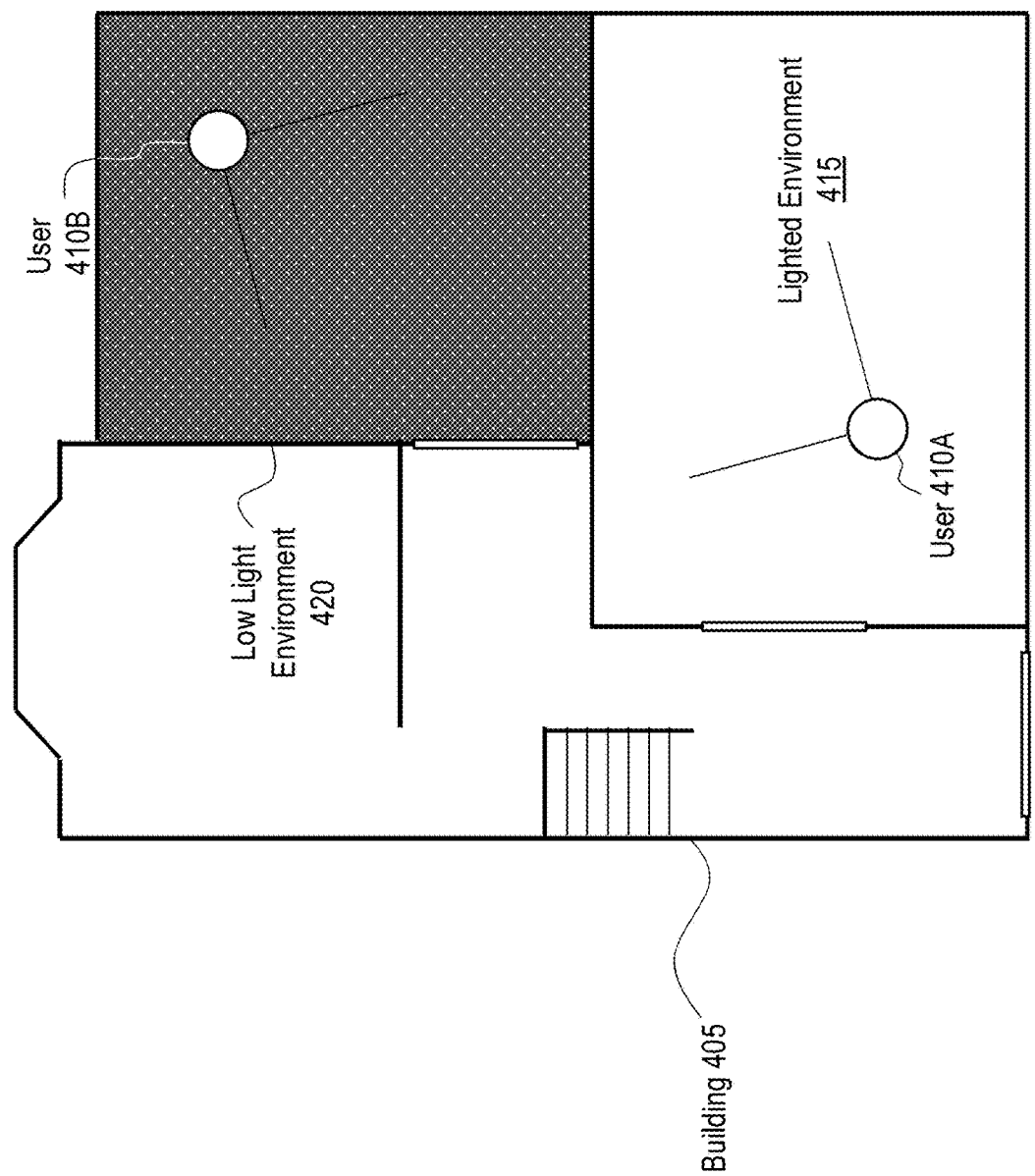
FIG. 4 illustrates an example of a lighted environment and an example of a low light environment.

FIG. 4 illustrates an example of a building 405 that can include various environments within which mixed-reality experiences may be provided using an MR device, such as HMD 300. The building 405 shown in FIG. 4 includes a lighted environment 415 and a low light environment 420. By way of example, the lighted environment 415 may have an environment illuminance that is about 10 lux or greater, and the low light environment 420 may have an environment illuminance that is about 10 lux or lower.

FIG. 4 also illustrates a user 410A positioned within the lighted environment 415 and a user 410B positioned within the low light environment. In the example shown in FIG. 4, both users 410A and 410B are operating an MR system that corresponds to HMD 300 and are participating in a mixed-reality experience (e.g., a shared mixed-reality experience or distinct mixed-reality experiences). The lines in FIG. 4 extending from the users 410A and 410B depict the field of view for each of the users 410A and 410B.

As noted above, in some embodiments, the head tracking cameras 305 of the HMD 300 are implemented as visible light cameras (e.g., visible light camera(s) as shown and described with reference to FIG. 1). Thus, in some instances, the head tracking cameras 305 of the MR system of user 410A are able to capture visual tracking data for detecting pose within the lighted environment 415.

Furthermore, in some implementations, the pass-through cameras 315 of the MR system of user 410B are able to capture images for providing parallax-corrected low light pass-through views of the low light environment 420 (e.g., for presentation on the displays 330A, 330B of the MR system). However, in some instances, the head tracking cameras 305 of the MR system of user 410B may fail to capture visual tracking data for detecting pose within the low light environment 420. For example, in the low light environment 420, head tracking images captured by head tracking cameras 305 of the MR system of user 410B may fail to include a sufficient number of identifiable feature points to enable accurate head tracking and accurate display of world-locked holograms with respect to the perspective of user 410B and/or the low light environment 420.

Figure 5A:
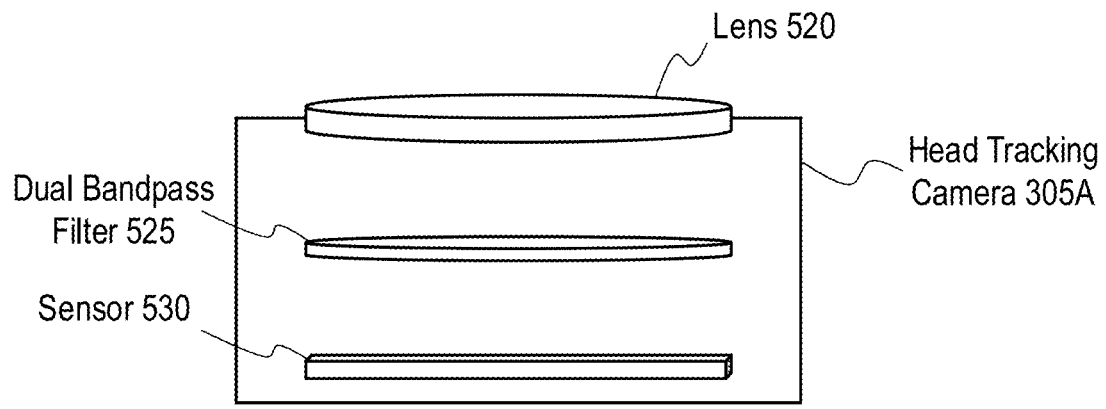
FIGS. 5A and 5B illustrate examples of head tracking cameras that are configured to detect visible and infrared (IR) light for computer vision applications.
Figure 5B:
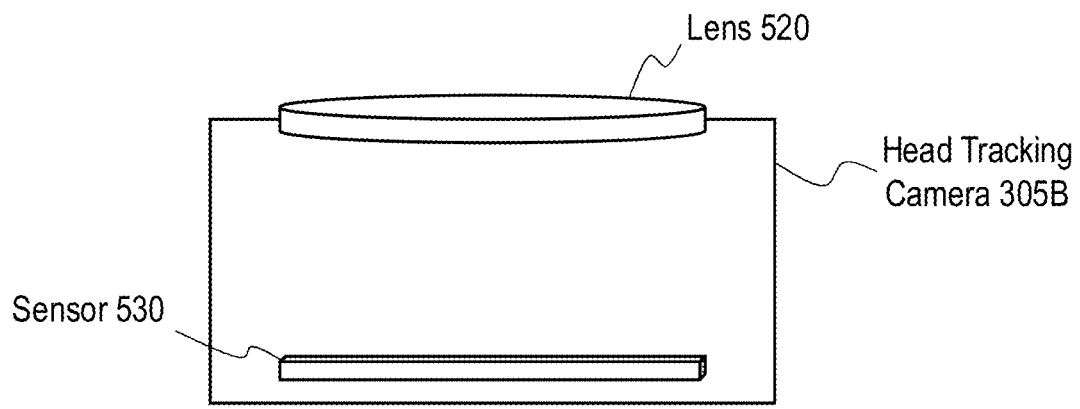

Thus, in some embodiments, the head tracking cameras 305 are configured to detect infrared (IR) light in addition to visible spectrum light. FIGS. 5A and 5B illustrate examples of head tracking cameras that are configured to detect infrared (IR) light. For example, FIG. 5A shows a conceptual representation of an example implementation of a head tracking camera 305A that includes a lens 520, a dual bandpass filter 525, and a sensor 530.

The sensor 530 is configured to detect at least some visible spectrum light (e.g., within a range of about 380 nm to about 740 nm) and at least some IR light (e.g., within a range of about 750 nm to about 1,100 nm). For example, in some instances, the sensor 530 is implemented as a sensor that comprises silicon, silicon-germanium, indium phosphide, indium gallium arsenide, and/or other materials. The lens 520 is operable to focus received light toward the sensor 530 and can comprise a single lens or any number of lenses and/or other optics.

FIG. 5A illustrates the head tracking camera 305A includes dual bandpass filter 525 intervening between the lens 520 and the sensor 530. The dual bandpass filter 525 is configured to transmit at least some visible spectrum light and at least some IR light. For example, in some instances, the dual bandpass filter 525 is configured to transmit visible spectrum light (e.g., wavelengths from about 380 nm to about 740 nm) and at least a particular band of wavelengths of IR light (e.g., within a range of about 750 nm to about 1,100 nm).

The particular band of IR light can be varied in different implementations. For example, in some instances, the particular band of IR light is generally centered around 850 nm, with the dual bandpass filter 525 being configured to provide peak transmission of IR light at approximately 850 nm. In other implementations, the particular band of IR light is generally centered around other wavelengths, such as, for example, 790 nm, 905 nm, 940 nm, etc. Furthermore, the dual bandpass filter 525 can be configured to provide peak transmission of IR light at other wavelengths, such as, for example, 790 nm, 905 nm, 940 nm, etc. Also, it should be noted that a head tracking camera 305A can include a bandpass filter configured to transmit any number of wavelength bands (e.g., multiple bands of visible light and/or multiple bands of IR light).

In this regard, the head tracking camera 305A of FIG. 5A is configured to receive both visible spectrum light and IR light at the lens 520 and direct such light toward the sensor 530 and/or the bandpass filter 525. The bandpass filter 525 is configured to transmit at least a portion of the visible spectrum light and at least a particular band of the IR light received through the lens 520 toward the sensor 530. The sensor 530 then detects the received visible and/or IR light signals, enabling the HMD (e.g., HMD 300) to determine visual tracking data for performing head tracking (e.g., to track pose for accurately displaying world-locked holograms) based on both visible light and IR light (if present).

Although FIG. 5A illustrates the dual bandpass filter 525 positioned between the lens 520 and the sensor 530, other configurations are within the scope of this disclosure, such as positioning the lens 520 between the dual bandpass filter 525 or eliminating the lens 520 altogether.

FIG. 5B illustrates an implementation of a head tracking camera 305B that includes a lens 520 and a sensor 530 while omitting a dual bandpass filter 525. In such implementations, the head tracking camera 305B is configured to receive both visible spectrum light and IR light at the lens 520 and direct such light toward the sensor 530, and the sensor 530 is configured to detect the received visible and/or IR light signals, enabling the HMD (e.g., HMD 300) to determine visual tracking data for performing head tracking (e.g., to track pose for accurately displaying world-locked holograms) based on both visible light and IR light (if present). In the foregoing example, the light signals detected by the sensor 530 are not limited by a bandpass filter, but only the spectrum response of the particular type of sensor implemented as sensor 530.

Those skilled in the art will recognize, in view of the present disclosure, that an HMD 300 (or another MR system) can include any number of head tracking cameras 305 that correspond to head tracking camera 305A of FIG. 5A, head tracking camera 305B of FIG. 5B, and/or combinations thereof.

Figure 6:
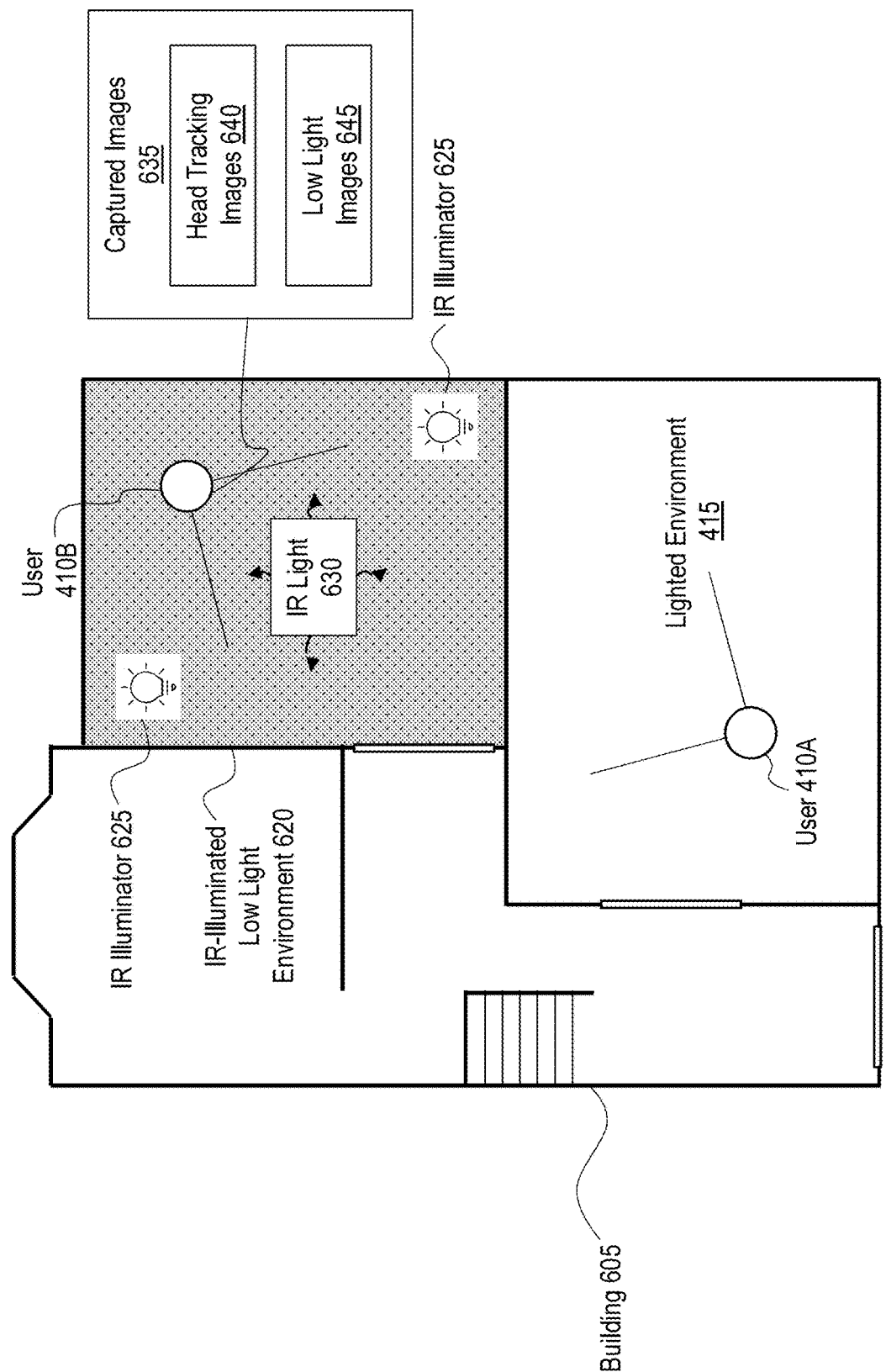
FIG. 6 illustrates an example of an IR-illuminated low light environment.

FIG. 6 illustrates an example of a building 605 that corresponds to the building 405 shown and described with reference to FIG. 4, except, whereas building 405 of FIG. 4 included a low light environment 420, building 605 of FIG. 6 includes an IR-illuminated low light environment 620. FIG. 6 illustrates the IR-illuminated low light environment 620 as being illuminated by one or more IR illuminators 625 positioned within the IR-illuminated low light environment 620. The IR illuminators 625 are configured to emit IR light 630 that is invisible to the unassisted eyes of user 410B. For example, in some instances, the IR light 630 includes IR light that is within a range of about 750 nm to about 1,100 nm. Furthermore, in some instances, the IR light 630 includes the particular band (or more than one particular band) of IR wavelengths that the dual bandpass filter(s) 525 of head tracking camera(s) 305A is(are) configured to transmit (see FIG. 5A and attendant description). For example, the IR illuminators 625 may provide peak emission of IR light 630 at 790 nm, 850 nm, 905 nm, 940 nm, etc.

Although FIG. 6 illustrates an implementation in which the IR illuminators 625 are distinct from and untethered to the user 410B and/or an MR system of the user (e.g., HMD 300), it should be noted that, in some implementations, one or more IR illuminators 625 are implemented into an MR system of the user and/or are otherwise tethered to a user and/or the HMD that is worn by the user.

As indicated hereinabove, the head tracking camera(s) 305 of the HMD 300 (or other MR system) of user 410B may correspond to head tracking camera 305A (from FIG. 5A), head tracking camera 305B (from FIG. 5B), or combinations thereof. Accordingly, in some instances, the head tracking camera(s) of the HMD 300 of user 410B are configured to detect the IR light 630 emitted by the IR illuminators 625 and/or reflected off of objects within the IR-illuminated low light environment 620.

In view of the foregoing, the HMD 300 of user 410B may obtain captured images 635, including head tracking images 640 captured by the head tracking cameras 305 of the HMD 300. In some instances, the head tracking images 640 include IR light 630 reflected within the IR-illuminated low light environment 620. The IR light 630 may increase the number of identifiable feature points within the head tracking images 640, as compared with head tracking images captured within low light environment 420 described hereinabove with reference to FIG. 4. Accordingly, in some implementations, the HMD 300 is configured to capture head tracking images 640 with IR light 630 to obtain visual tracking data to perform head tracking and provide accurate display of world-locked holograms within IR-illuminated low light environments 620.

It should be noted that, in some instances, an HMD 300 obtains depth maps for providing visual mapping, as described hereinabove, within the same physical space under different lighting conditions. For example, an HMD 300 of user 410B may provide visual mapping of the physical space of IR-illuminated low light environment 620 under IR illumination (as shown in FIG. 6), and may also (e.g., at a different time) provide visual mapping of the same physical space under visible light illumination. For example, HMD 300 may perform visual mapping of a space under IR illumination, and then, after visible light illuminators are turned on within the same space, the HMD 300 may continue to perform visual mapping of the space (or vice versa).

In some instances, the IR illuminators (e.g., IR illuminators 625) within the physical space are in different positions than visible light illuminators within the same physical space. Thus, visual maps obtained under IR illumination may differ at least slightly from visual maps obtained under visible light illumination (e.g., different feature points within the environments may be present in the IR head tracking images 640 as compared with visible light head tracking images). Accordingly, in some instances, inconsistencies may arise (e.g., positional flickers) when an MR system displays a world-locked hologram with respect to physical objects/environments throughout a transition from one lighting condition to another (e.g., from IR-illuminated to visible light illuminated, or vice versa).

Thus, in some implementations, the HMD 300 establishes a map-to-map correspondence between visual maps obtained under visible light conditions and visual maps obtained under IR light conditions, such that objects represented in the visual maps obtained under different lighting conditions are consistent (e.g., aligned) with one another. In this regard, an HMD 300 may provide a smooth transition while presenting world-locked holograms with respect to physical objects/environments throughout a transition from one lighting condition to another.

As noted hereinabove, situations may arise where a user desires a mixed-reality experience that includes both accurate world-locked hologram display and parallax-corrected pass-through image display under lighting conditions that include low light conditions (e.g., in gaming scenarios, in training scenarios, etc.). In view of the foregoing, an HMD 300 of the present disclosure may be configured to capture head tracking images 640 with head tracking cameras 305 to enable accurate world-locked hologram display under IR-illuminated low light conditions (see FIG. 6). However, in some instances, the pass-through cameras 315 of the HMD 300 are implemented as low light cameras (e.g., low light cameras 115 from FIG. 1). As noted hereinabove, in some implementations, low light cameras are sensitive to at least some IR light within a range of about 750 nm to about 1,100 nm. Thus, pass-through cameras 315 of the HMD 300 may detect IR light 630 within an IR-illuminated low light environment 620. IR light 630 detected by a pass-through camera 315 may affect the appearance of image data captured by the pass-through camera 315 and may cause generated pass-through images to appear unrealistic (e.g., artificially illuminated) and/or otherwise unacceptable.

Figure 7:
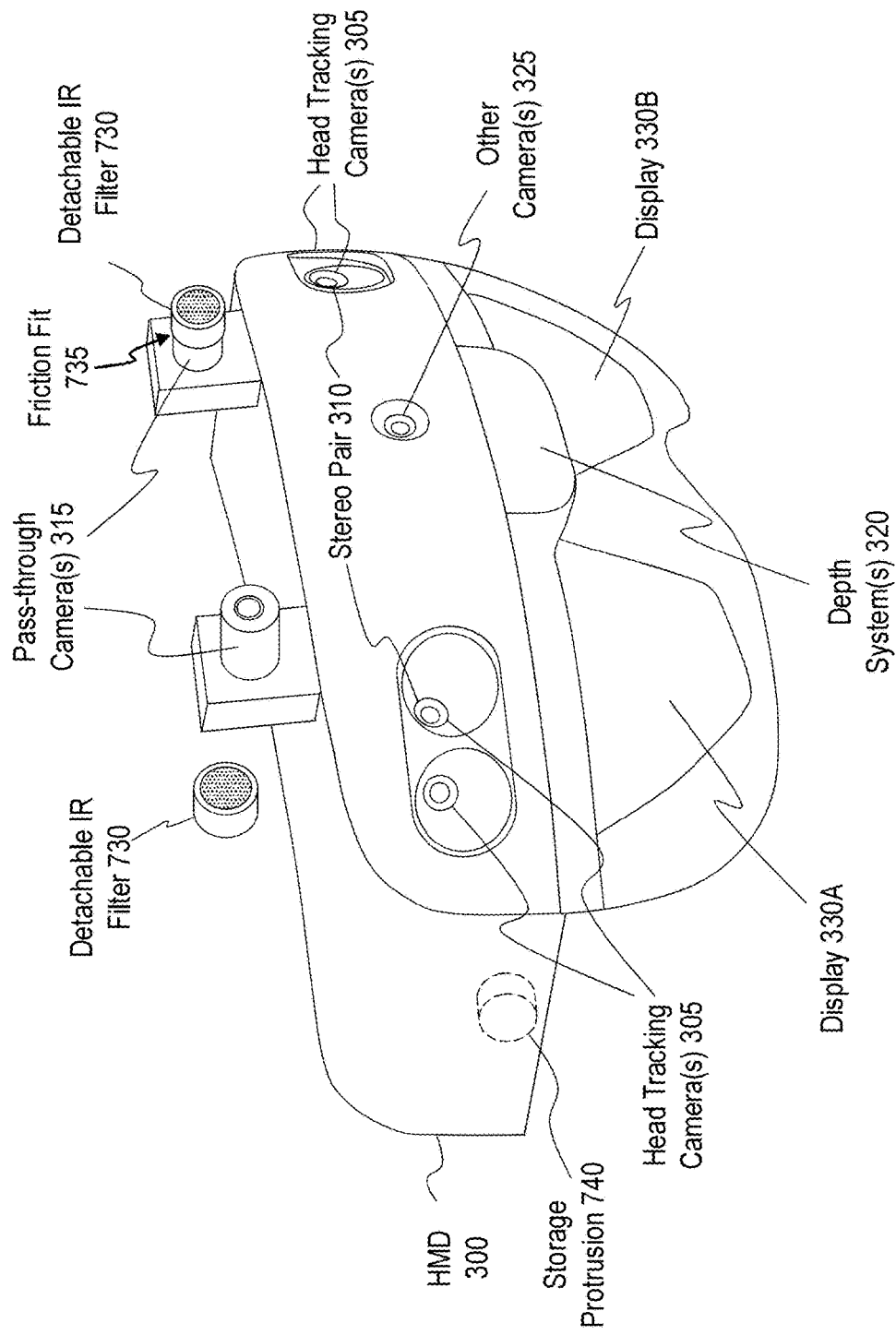
FIG. 7 illustrates an example of a HMD that includes detachable IR filters for sensors configured for performing video passthrough to the user.

Accordingly, FIG. 7 illustrates that, in some implementations, an HMD 300 includes detachable IR filters 730 for the set of pass-through cameras 315. The detachable IR filters 730 are configured to attenuate IR light, such as a particular band of wavelengths of IR light. In implementations where the head tracking cameras 305 include a dual bandpass filter 525, the band of wavelengths of IR light attenuated by the detachable IR filters 730 may comprise at least a portion of the band of IR light that the dual bandpass filter(s) 525 are configured to transmit. Similarly, the band of wavelengths of IR light attenuated by the detachable IR filters 730 may comprise at least a portion of the band of IR light 630 that an IR illuminator 625 is configured to emit (see FIG. 6).

Thus, referring again to FIG. 6, in some implementations, an IR illuminator 625 emits IR light 630 that is detectable by the head tracking cameras 305 (e.g., whether transmitted through a dual bandpass filter 525 or detected directly by a sensor 530 without a dual bandpass filter 525) and that is attenuated by the detachable IR filters 730 of the pass-through cameras 315. Accordingly, an HMD 300 (e.g., of user 410B, for example) may obtain captured images 635 within an IR-illuminated low light environment 620 that include both a set of head tracking images 640 (captured with head tracking cameras 305) and a set of low light images 645 (captured with pass-through cameras 315). The head tracking cameras 305, in some instances, capture the set of head tracking images 640 using reflected IR light 630 (e.g., within a particular band of wavelengths of IR light), and the pass-through cameras 315, in some instances, capture the set of low light images 645 while omitting IR light 630 that is attenuated by the detachable IR filters 730.

In some implementations, the HMD 300 uses the set of head tracking images 640 to obtain visual tracking data for performing head tracking to generate pose data within the IR-illuminated low light environment 620 (e.g., for displaying world-locked holograms with respect to the environment). Furthermore, in some implementations, the HMD 300 further uses the set of low light images 645 to generate parallax-corrected pass-through views of the IR-illuminated low light environment 620. In some instances, because the pass-through cameras 315 capture the set of low light images 645 while the detachable IR filters 730 at least partially attenuate IR light 630, the parallax-corrected pass-through views generated using the set of low light images 645 may at least partially avoid appearing artificially illuminated by the IR light 630 present in the IR-illuminated low light environment 620. The HMD 300 may further display world-locked holograms (e.g., according to the pose data generated by performing head tracking) and/or parallax-corrected pass-through views on the displays 330A, 330B of the HMD 300.

Accordingly, at least some MR systems of the present disclosure are configured to facilitate computer vision tasks and pass-through imaging under the same lighting conditions. For example, as described hereinabove, HMD 300 may be configured facilitate mixed-reality experiences under IR-illuminated low light conditions by accurately displaying world-locked holograms with respect to an environment (e.g., relying on head tracking) and by providing realistic parallax-corrected low light pass-through images of the environment. Such experiences may be useful, for example, for gaming, training (e.g., for first responders), and/or other purposes.

Attention is again directed to FIG. 7, which illustrates an implementation in which the detachable IR filters 730 of the pass-through cameras 315 are selectively detachable from the pass-through cameras 315 via a removable friction fit 735. By way of non-limiting example, the detachable IR filters 730 may include a gasket (e.g., composed of rubber or another polymer or elastic material) that forms a friction fit over a lens of a pass-through camera. In this regard, the detachable IR filters 730 of the present disclosure may be field-replaceable and/or readily deployable in preparation for participating in a mixed-reality experience that implements head tracking and parallax-corrected low light pass-through images under IR-illuminated low light conditions as described herein. In some instances, providing detachable IR filters 730 enables users to readily configure the HMD 300 for use in IR-illuminated low light conditions (e.g., by attaching the detachable IR filters 730 to the pass-through cameras 315) and for use in other conditions (e.g., by detaching the detachable IR filters 730 from the pass-through cameras 315).

For example, a user may prepare for a training exercise that displays world-locked holograms (relying on head tracking) and pass-through images under low light conditions by attaching the detachable IR filters 730 to an HMD 300. The same user may also prepare for an in-the-field activity (or another activity where active IR illumination is absent from low light environments) that displays low light pass-through images without world-locked holograms by detaching the detachable IR filters 730 from the HMD 300. Accordingly, in some embodiments, a user (e.g., a first responder) can reconfigure a single HMD 300 for use in training exercise and in-the-field activities by selectively attaching or detaching the detachable IR filters 730 from the pass-through cameras 315 of the HMD 300.

FIG. 7 also demonstrates that, in some implementations, the HMD 300 may include a storage protrusion 740 (or more than one storage protrusion 740) that is configured to selectively receive and retain a detachable IR filter 730 when the detachable IR filter 730 is not in use. For example, the storage protrusion 740 may include a diameter that corresponds to the diameter of the lens enclosure of the pass-through cameras 315, such that the detachable IR filters 730 are also selectively detachable from the storage protrusion 740 via a removable friction fit. Additionally, or alternatively, some implementations may include other mechanisms for retaining a detachable IR filter 730 when not disposed on the pass-through camera(s) 315, such as one or more tethering elements (e.g., a strap, cord, wire, etc.)

Figure 8E:
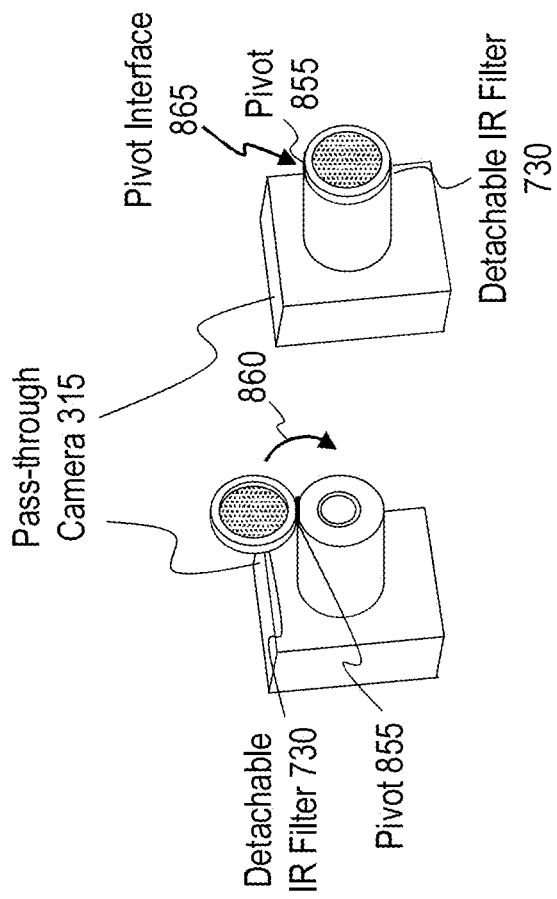

FIGS. 8A-8E illustrate various non-limiting example implementations of detachable IR filters 730 for pass-through cameras 315 of an HMD 300. FIG. 8A illustrates a detached configuration of an example detachable IR filter 730 that includes interior threads 805A. FIG. 8A also shows that the pass-through camera 315 may include corresponding threads 805B that are configured to thread into the interior threads 805A of the detachable IR filter 730 to form a threaded interface 810 when the detachable IR filter 730 and the pass-through camera 315 are in an attached configuration (also shown in FIG. 8A).

FIG. 8B illustrates a detached configuration of an example detachable IR filter 730 that includes a magnet 815A (or a magnetizable element). FIG. 8B also shows that the pass-through camera 315 may include corresponding magnet 815B (or a corresponding magnetizable element) that is configured to magnetically engage with the magnet 815A (or magnetizable element) of the detachable IR filter 730 to form a magnetic interface 820 when the detachable IR filter 730 and the pass-through camera 315 are in an attached configuration (also shown in FIG. 8B).

FIG. 8C illustrates a detached configuration of an example detachable IR filter 730 that includes an actuator 825, such as a pressable button, rotatable element, or other feature that actuates an actuatable portion of the detachable IR filter 730 (e.g., a movable engagement member). FIG. 8C also shows that the pass-through camera 315 may include corresponding slot 830 (or other corresponding opening or engagement member) that is configured to mechanically engage with an actuatable portion of the detachable IR filter 730 to form an engagement interface 835 when the detachable IR filter 730 and the pass-through camera 315 are in an attached configuration (also shown in FIG. 8C). It should be noted that, in some instances, the actuator and/or actuatable portion for facilitating the engagement interface are positioned on the pass-through camera 315 instead of the detachable IR filter 730 and the slot (or other corresponding opening or engagement member) is positioned on the detachable IR filter 730 instead of the pass-through camera 315. In other instances, both the pass-through camera 315 and the detachable IR filter include actuators, actuatable portions, and/or slots (or other corresponding openings or engagement members).

Those skilled in the art will recognize, in view of the present disclosure, that a storage protrusion 740 of an HMD (see FIG. 7), where and when implemented, may be configured to removably secure a detachable IR filter 730 in the same or similar manner as any of the pass-through cameras 315 of the HMD. For example, where a pass-through camera 315 includes threads for receiving a detachable IR filter 730 (e.g., threads 805B from FIG. 8A), the storage protrusion 740 may also be configured with a correspondingly set of similar threads for detachably and threadedly engaging the IR filter 730 when it is not in use. Similarly, where a pass-through camera 315 includes a magnet or magnetizable element for receiving a detachable IR filter 730 (e.g., magnet 815B from FIG. 8B), the storage protrusion 740 may also be configured with a correspondingly similar magnet or magnetizable element for detachably retaining the IR filter 730 when it is not in use. In another example, where a pass-through camera 315 includes a slot and/or actuator for receiving a detachable IR filter 730 (e.g., slot 830 from FIG. 8C), the storage protrusion 740 may also be configured with a correspondingly similar slot and/or actuator for detachably securing the IR filter 730 when it is not in use.

The HMD may also be configured with a pair of such storage protrusion(s), described above, to store corresponding pairs of IR filters (e.g., one for each camera). In some instances, the HMD may also be configured with a plurality of different sets of IR filters 730 that have different properties and that may all be detachably secured to corresponding sets of storage protrusions (not shown).

Figure 8D:
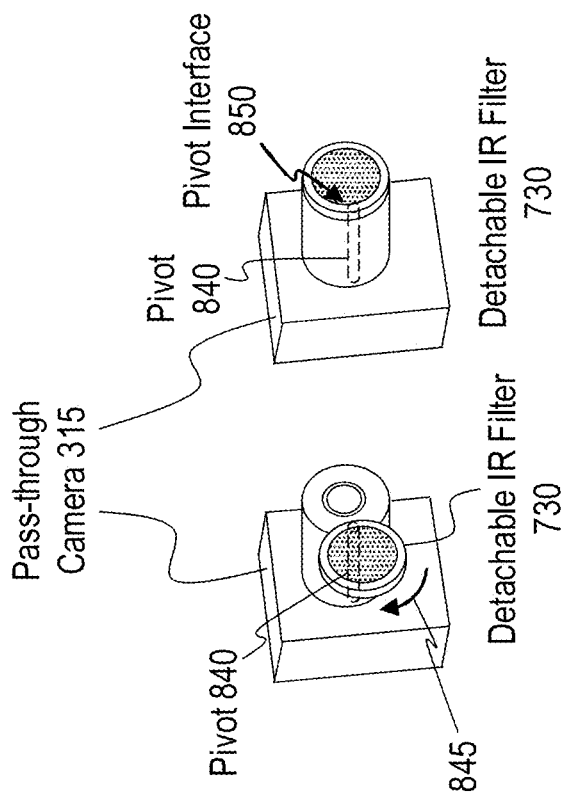

FIGS. 8D and 8E illustrate additional example implementations in which a detachable IR filter 730 is fixedly attached to a portion of a pass-through camera 315 while still being selectively repositionable with respect to the pass-through camera 315 and/or the lens of the pass-through camera 315.

For example, FIG. 8D illustrates an implementation in which the pass-through camera 315 includes a pivot 840 that extends parallel to the center axis of the lens of the pass-through camera 315. The detachable IR filter 730 is connected to the pivot 840 to form a pivot interface 850 therewith wherein the detachable IR filter 730 is rotatable about the pivot 840 to enable the detachable IR filter 730 to selectively cover the lens of the pass-through camera 315 (as indicated in FIG. 8D by arrow 845).

FIG. 8E illustrates another example implementation in which the pass-through camera 315 includes a pivot 855 that extends perpendicular to the center axis of the pass-through camera 315. For example, pivot 855 may be implemented as a hinge. The detachable IR filter 730 is connected to the pivot 855 to form a pivot interface 865 (e.g., a hinge interface) therewith wherein the detachable IR filter 730 is rotatable about the pivot 855 to enable the detachable IR filter 730 to selectively cover the lens of the pass-through camera 315 (as indicated in FIG. 8E by arrow 860).

Furthermore, those skilled in the art will appreciate, in view of the present disclosure, that other mechanical attachment techniques not explicitly shown in FIGS. 8A-8E are within the scope of this disclosure, such as, but not limited to, techniques that utilize clamps, clips, engagement channels/protrusions, hook and loop connectors, slide connectors, etc. It will also be appreciated that although many examples have been described, for simplicity, to only reference a single IR filter and a corresponding camera for that filter, the disclosed embodiments clearly include configurations that incorporate a matching pair of cameras and corresponding detachable IR filters.

Example Method(s) for Upsampling Low Temporal Resolution Depth Maps

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
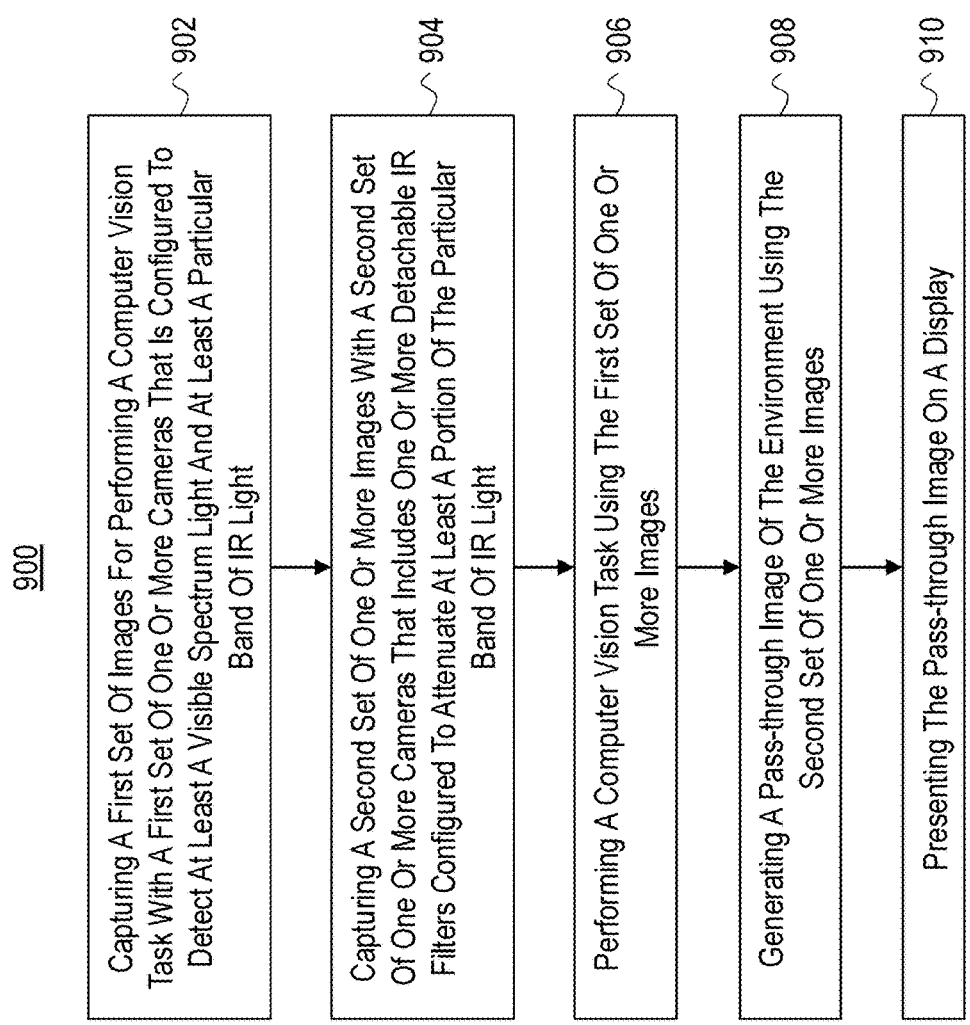
FIG. 9 illustrates an example flow diagram depicting a method for facilitating computer vision tasks and pass-through imaging.

FIG. 9 illustrates an example flow diagram 900 that depicts various acts associated with facilitating computer vision tasks and pass-through imaging, as disclosed herein. The discussion of the various acts represented in flow diagram 900 includes references to various hardware components described in more detail with reference to FIGS. 1, 3, 5A, 5B, 7, and 10.

Act 902 of flow diagram 900 is capturing a first set of images for performing a computer vision task with a first set of one or more cameras that is configured to detect at least a visible spectrum light and at least a particular band of IR light.

Act 902 is performed, in some instances, using one or more head tracking cameras 305 of an MR system (e.g., HMD 300 from FIG. 3) that include a bandpass filter (e.g., dual bandpass filter 525 from FIG. 5A) or that omit filters (e.g., according to head tracking camera 305B of FIG. 5B) to enable the one or more head tracking cameras 305 to detect both the visible spectrum light and one or more particular bands of IR light. The particular band of IR light can include substantially any wavelength or range of wavelengths within a range of about 750 nm to about 1,000 nm.

Accordingly, in some implementations, such as where an IR illuminator (e.g., IR illuminator 625 from FIG. 6) projects IR light (e.g., IR light 630 from FIG. 6) into an environment, the first set of one or more images is captured with at least some of the particular band of IR light that is reflected in an environment (e.g., an IR-illuminated low light environment 620 from FIG. 6).

Act 904 of flow diagram 900 includes capturing a second set of one or more images with a second set of one or more cameras that includes one or more detachable IR filters configured to attenuate at least a portion of the particular band of IR light. Act 904 is performed, in some instances, using one or more pass-through cameras 315 (e.g., a stereo pair of pass-through cameras 315) of an MR system (e.g., HMD 300 from FIG. 3), or other cameras configured for capturing image data of an environment for display to a user. The one or more detachable IR filters may correspond to the detachable IR filters 730 described herein with reference to FIGS. 7-8C.

Accordingly, in some implementations, such as where an IR illuminator (e.g., IR illuminator 625 from FIG. 6) projects IR light (e.g., IR light 630 from FIG. 6) into an environment, the second set of one or more images omit attenuated IR light that is attenuated by the one or more detachable IR filters.

Act 906 of flow diagram 900 is performing a computer vision task using the first set of one or more images. Act 906 is performed, in some instances, using one or more of processor(s) 1005 (from FIG. 10), accelerometer(s) 155, gyroscope(s) 160, compass(es) 165 (from FIG. 1), and/or other components of an MR system (e.g., HMD 300 from FIG. 3). In some instances, the computer vision task is head tracking. For example, in some implementations, a system may identify visual tracking data (e.g., feature points) from the first set of one or more images and then may use the visual tracking data in conjunction with inertial tracking data (e.g., generated by one or more of accelerometer(s) 155, gyroscope(s) 160, and/or compass(es) 165) to generate pose data (e.g., 6DOF pose) associated with the system. The system may then display world-locked holograms based on the pose data.

Other computer vision tasks are within the scope of this disclosure, such as, by way of non-limiting example, event detection, automatic inspection, process control, interaction detection, navigation, modeling, semantic segmentation, instance segmentation, object localization, image classification, object/marker detection (e.g., QR code scanning), image captioning, etc.

Act 908 of flow diagram 900 is generating a pass-through image of the environment using the second set of one or more images. Act 908 is performed, in some instances, using one or more of processor(s) 1005 (from FIG. 10) of a computer system (e.g., HMD 300 from FIG. 3). In some instances, generating the pass-through image of the environment includes using the second set of one or more images to generate one or more depth maps (e.g., by performing stereo matching) and reprojecting image data from the second set of one or more images to correspond to a perspective of one or more of a user's eyes using the generated one or more depth maps.

Act 910 of flow diagram 900 is presenting the pass-through image on a display. Act 910 is performed, in some instances, using one or more of processor(s) 1005, graphics rendering engine(s) 1025, display system(s) 1030, I/O interface(s) 1035 (from FIG. 10), displays 330A and/or 330B (from FIG. 3) and/or other components of a computer system (e.g., HMD 300 from FIG. 3). In some implementations, a computer system displays one or more world-locked holograms in coordination with displaying the pass-through image on the display to provide a mixed-reality experience (e.g., a mixed-reality experience within an IR-illuminated low light environment).

Notwithstanding the foregoing embodiments that utilize visible and IR filters, it will be appreciated that the scope of the invention also includes embodiments in which the cameras are configured to be sensitive to the particular spectrums of light that correspond to the aforementioned filters, albeit independently of the filters, and such that the embodiments are performed without requiring use of the aforementioned filters.

EXAMPLE COMPUTER SYSTEM(S)

Figure 10:
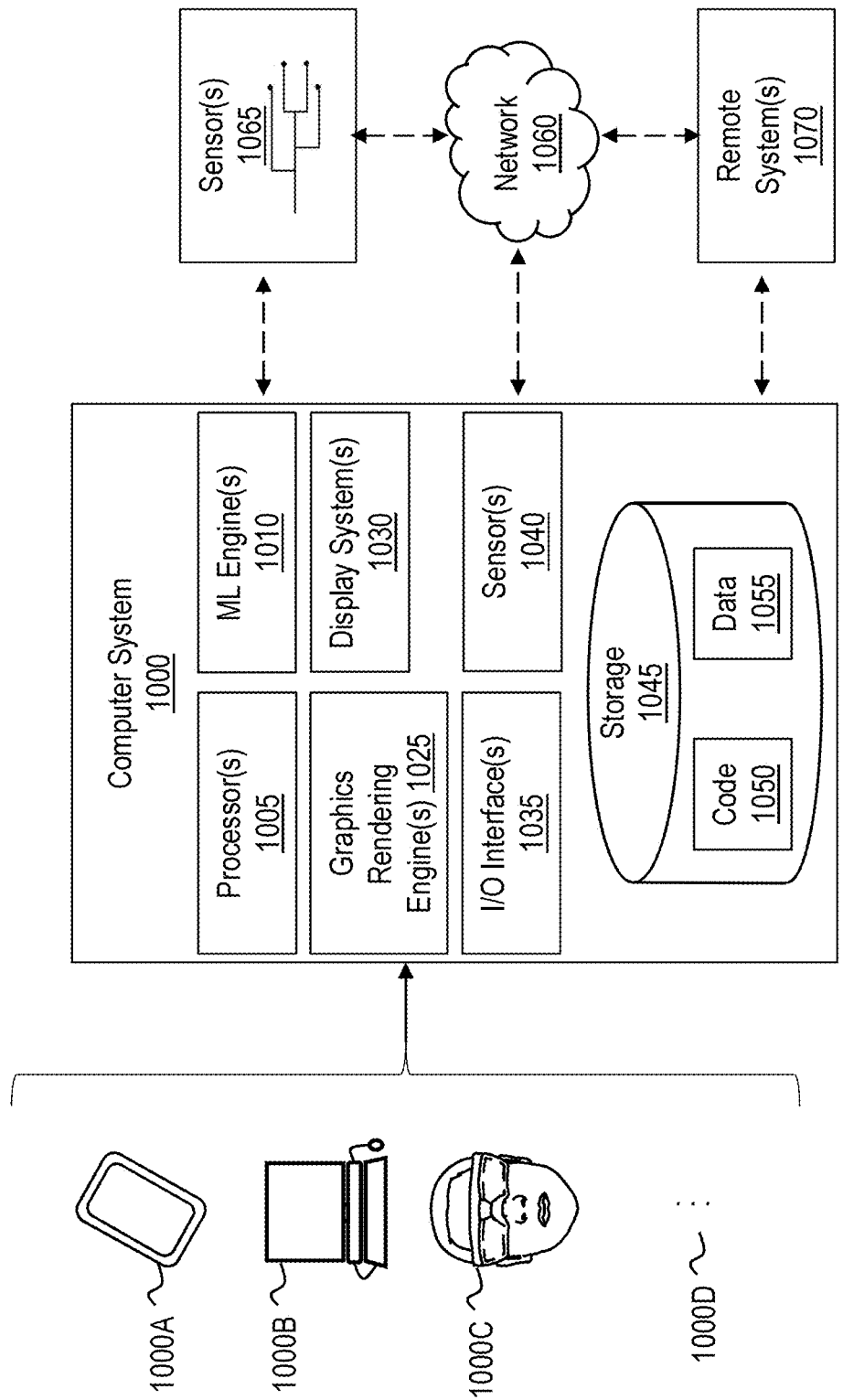
FIG. 10 illustrates an example computer system that may include and/or be used to perform disclosed embodiments.

Having just described the various features and functionalities of some of the disclosed embodiments, the focus will now be directed to FIG. 10 which illustrates an example computer system 1000 that may include and/or be used to facilitate the embodiments described herein, including the acts described in reference to FIG. 10. In particular, this computer system 1000 may be implemented as part of a mixed-reality HMD, such as any HMD referenced herein.

Computer system 1000 may take various different forms. For example, computer system 1000 may be embodied as a tablet, a desktop, a laptop, a mobile device, a cloud device, an HMD, or a standalone device, such as those described throughout this disclosure. Computer system 1000 may also be a distributed system that includes one or more connected computing components/devices that are in communication with computer system 1000. FIG. 10 specifically calls out how computer system 1000 may be embodied as a tablet 1000A, a laptop 1000B, or an HMD 1000C, but the ellipsis 1000D indicates that computer system 1000 may be embodied in other forms as well.

The computer system 1000 includes various different components. FIG. 10 shows that computer system 1000 includes one or more processors 1005 (aka a "hardware processing unit"), a machine learning (ML) engine 1010, graphics rendering engine(s) 1025, a display system 1030, input/output (I/O) interfaces 1035, one or more sensors 1040, and storage 1045.

Regarding the processor(s) 1005, it will be appreciated that the functionality described herein can be performed, at least in part, by one or more hardware logic components (e.g., the processor(s) 1005). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

The ML engine 1010 may be implemented as a specific processing unit (e.g., a dedicated processing unit as described earlier) configured to perform one or more specialized operations for the computer system 1000. The ML engine 1010 (or perhaps even just the processor(s) 1005) can be configured to perform any of the disclosed method acts or other functionalities.

In some instances, the graphics rendering engine 1025 is configured, with the hardware processing unit 1005, to render one or more virtual objects within the scene. As a result, the virtual objects accurately move in response to a movement of the user and/or in response to user input as the user interacts within the virtual scene. The computer system 1000 may include a display system 1030 (e.g., laser diodes, light emitting diodes (LEDs), microelectromechanical systems (MEMS), mirrors, lens systems, diffractive optical elements (DOES), display screens, and/or combinations thereof) for presenting virtual objects within the scene.

I/O interface(s) 1035 includes any type of input or output device. Such devices include, but are not limited to, touch screens, displays, a mouse, a keyboard, a controller, and so forth. Any type of input or output device should be included among I/O interface(s) 1035, without limitation.

During use, a user of the computer system 1000 is able to perceive information (e.g., a mixed-reality environment) through a display screen that is included among the I/O interface(s) 1035 and that is visible to the user. The I/O interface(s) 1035 and sensors 1040/1065 may also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 1000 may also be connected (via a wired or wireless connection) to external sensors 1065 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 1045 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1045 is shown as including executable instructions (i.e. code 1050). The executable instructions (i.e. code 1050) represent instructions that are executable by the processor(s) 1005 of computer system 1000 to perform the disclosed operations, such as those described in the various methods. Storage 1045 is also shown as including data 1055. Data 1055 may include any type of data, including image data, depth maps and other depth data, pose data, tracking data, and so forth, without limitation.

The disclosed embodiments may comprise or utilize a special-purpose or general-purpose computer including computer hardware, such as, for example, one or more processors (such as processor(s) 1005) and system memory (such as storage 1045), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1060. For example, computer system 1000 can communicate with any number devices or cloud services to obtain or process data. In some cases, network 1060 may itself be a cloud network. Furthermore, computer system 1000 may also be connected through one or more wired or wireless networks 1060 to remote/separate computer systems(s) 1070 that are configured to perform any of the processing described with regard to computer system 1000.

A "network," like network 1060, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1060. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system that is configured for facilitating both computer vision tasks performed with a first set of cameras, as well as pass-through imaging with a second set of cameras, comprising:
a head-mounted display (HMD), comprising:
a first set of one or more cameras configured for performing computer vision tasks, the first set of one or more cameras being configured to detect at least a visible spectrum light and at least a particular band of wavelengths of infrared (IR) light;
a second set of one or more cameras configured for capturing image data for projection to a user of the HMD, the second set of one or more cameras being sensitive to visible light and IR light, including at least a portion of the particular band of wavelengths of IR light, the second set of one or more cameras comprising one or more detachable IR filters configured to attenuate IR light, including at least the portion of the particular band of wavelengths of IR light, the one or more detachable IR filters being selectively securable to the second set of one or more cameras to at least partially filter at least the portion of the particular band of wavelengths of IR light from the second set of one or more cameras during operation of the HMD to cause imagery captured by the second set of one or more cameras to omit at least the portion of the particular band of wavelengths when the one or more detachable IR filters are selectively secured to the second set of one or more cameras, the one or more detachable IR filters being selectively removable from the second set of one or more cameras to enable the second set of one or more cameras to detect at least the portion of the particular band of wavelengths of IR light during operation of the HMD to cause imagery captured by the second set of one or more cameras to be based upon at least the portion of the particular band of wavelengths when the one or more detachable IR filters are selectively removed from the second set of one or more cameras;
one or more processors; and
one or more hardware storage devices that store instructions that are executable by the one or more processors to configure the HMD to:
capture, with the first set of one or more cameras, a first set of one or more images for performing a computer vision task, wherein the first set of one or more images is captured based upon the particular band of wavelengths of IR light;
when the one or more detachable IR filters are selectively secured to the second set of one or more cameras:
capture, with the second set of one or more cameras, a second set of one or more images, wherein the second set of one or more images omits image data based upon the portion of the particular band of wavelengths of IR light;
generate a pass-through image based upon the second set of one or more images; and
display a world-locked hologram in combination with the pass-through image on a display of the HMD, the display of the world-locked hologram being based upon the performance of the computer vision task on the first set of one or more images; and
when the one or more detachable IR filters are selectively removed from the second set of one or more cameras:
capture, with the second set of one or more cameras, a third set of one or more images, wherein the third set of one or more images includes image data based upon the particular band of wavelengths of IR light;
generate a second pass-through image based upon the third set of one or more images; and
refrain from displaying a world-locked hologram in combination with the second pass-through image on the display of the HMD.

2. The system of claim 1, further comprising:
an IR illuminator configured to emit IR light that includes at least the portion of the particular band of wavelengths of IR light that is attenuated by the one or more detachable IR filters.

3. The system of claim 2, wherein the IR illuminator is configured to emit IR light within a range of 750 nm to 1,100 nm.

4. The system of claim 3, wherein the IR illuminator is configured to provide peak emission of IR light at approximately 850 nm.

5. The system of claim 1, wherein the first set of one or more cameras comprises a dual bandpass filter configured to transmit at least the visible spectrum light and the particular band of wavelengths of IR light.

6. The system of claim 5, wherein the dual bandpass filter provides peak transmission of IR light at approximately 850 nm.

7. The system of claim 1, wherein the one or more detachable IR filters are configured to selectively attach to the second set of one or more cameras via a friction fit.

8. The system of claim 1, wherein the first set of one or more cameras or the second set of one or more cameras is a stereo pair of cameras.

9. The system of claim 1, wherein the HMD further comprises:
one or more processors; and
one or more hardware storage devices having stored computer-executable instructions that are operable, when executed by the one or more processors, to cause the HMD to:
capture, with the first set of one or more cameras, a first set of one or more images for performing a computer vision task, wherein the first set of one or more images is captured with at least some of the particular band of wavelengths of IR light; and
capture, with the second set of one or more cameras, a second set of one or more images, wherein the second set of one or more images omit attenuated IR light that is attenuated by the one or more detachable IR filters.

10. The system of claim 9, wherein:
the first set of one or more cameras comprises one or more cameras that perform simultaneous location and mapping, and
the computer-executable instructions are further operable, when executed by the one or more processors, to cause the HMD to perform head tracking using the first set of one or more images.

11. The system of claim 1, wherein the second set of one or more cameras comprises a stereo pair of low light cameras.

12. A method for facilitating both computer vision tasks and pass-through imaging with different sets of cameras, comprising:
securing one or more detachable infrared (IR) filters to a second set of one or more cameras of a head-mounted display (HM D), the one or more detachable IR filters being configured to attenuate IR light, including at least a portion of a particular band of wavelengths of IR light, the one or more detachable IR filters being selectively securable to the second set of one or more cameras to at least partially filter at least the portion of the particular band of wavelengths of IR light from the second set of one or more cameras during operation of the HMD to cause imagery captured by the second set of one or more cameras to omit at least the portion of the particular band of wavelengths when the one or more detachable IR filters are selectively secured to the second set of one or more cameras, the one or more detachable IR filters being selectively removable from the second set of one or more cameras to enable the second set of one or more cameras to detect at least the portion of the particular band of wavelengths of IR light during operation of the HMD to cause imagery captured by the second set of one or more cameras to be based upon at least the portion of the particular band of wavelengths when the one or more detachable IR filters are selectively removed from the second set of one or more cameras;
causing an IR illuminator to emit the particular band of wavelengths of IR light within a first environment;
within the first environment, capturing, with a first set of one or more cameras of the HMD, a first set of one or more images for performing a computer vision task, wherein:
the first set of one or more cameras is configured to detect at least a visible spectrum light and at least the particular band of wavelengths of IR light emitted by the IR illuminator within the first environment, and
the first set of one or more images is captured with at least some of the particular band of wavelengths of IR light that is reflected in the first environment;
within the first environment, when the one or more detachable IR filters are selectively secured to the second set of one or more cameras, capturing, with the second set of one or more cameras of the HMD, a second set of one or more images for projection to a user of the HMD, wherein the second set of one or more images omits image data based upon the portion of the particular band of wavelengths of IR light that is emitted by the IR illuminator within the first environment;
within the first environment, using the second set of one or more images to display a pass-through image on a display of the HMD;
within the first environment, using the performance of the computer vision task on the first set of one or more images to cause display of a world-locked hologram on the display of the HMD in combination with the pass-through image;
removing the one or more detachable infrared (IR) filters to the second set of one or more cameras of the HMD;
within a second environment that omits the IR illuminator, capturing, with the first set of one or more cameras of the HMD, a third set of one or more images for performing the computer vision task;
within the second environment, when the one or more detachable IR filters are selectively removed from the second set of one or more cameras, capturing, with the second set of one or more cameras of the HMD, a fourth set of one or more images for projection to a user of the HMD, wherein the fourth set of one or more images is captured based upon the particular band of wavelengths of IR light within the second environment, using the fourth set of one or more images to display a second pass-through image on the display of the HMD; and within the second environment, refraining from using the performance of the computer vision task on the third set of one or more images to cause display of a world-locked hologram on the display of the HMD in combination with the second pass-through image.

13. The method of claim 12, wherein the IR illuminator is configured to emit IR light within a range of 750 nm to 1,100 nm.

14. The method of claim 12, further comprising:
performing head tracking using the first set of one or more images.

15. The method of claim 12, wherein the second set of one or more cameras comprises a stereo pair of low light cameras.

16. The method of claim 12, wherein the first set of one or more cameras comprises a dual bandpass filter configured to transmit at least the visible spectrum light and the particular band of wavelengths of IR light.

17. One or more hardware storage devices having stored thereon computer-executable instructions, the computer-executable instructions being executable by one or more processors of a computer system, which is configured for facilitating both computer vision tasks and pass-through imaging with different sets of cameras in IR-illuminated environments, to cause the computer system to:

capture, with a first set of one or more cameras of a head-mounted display (HMD), a first set of one or more images for performing a computer vision task, wherein:
the first set of one or more cameras is configured to detect at least a visible spectrum light and at least a particular band of wavelengths of infrared (IR) light emitted by an IR illuminator, and
the first set of one or more images is captured with at least some of the particular band of wavelengths of IR light that is reflected in an environment; and when one or more detachable IR filters are selectively secured to a second set of one or more cameras of the HMD:
capture, with the second set of one or more cameras of the HMD, a second set of one or more images, wherein the one or more detachable IR filters are configured to attenuate IR light, including at least a portion of the particular band of wavelengths of IR light, the one or more detachable IR filters being selectively securable to the second set of one or more cameras to at least partially filter at least the portion of the particular band of wavelengths of IR light from the second set of one or more cameras during operation of the HMD to cause imagery captured by the second set of one or more cameras to omit at least the portion of the particular band of wavelengths when the one or more detachable IR filters are selectively secured to the second set of one or more cameras, the one or more detachable IR filters being selectively removable from the second set of one or more cameras to enable the second set of one or more cameras to detect at least the portion of the particular band of wavelengths of IR light during operation of the HMD to cause imagery captured by the second set of one or more cameras to be based upon at least the portion of the particular band of wavelengths when the one or more detachable IR filters are selectively removed from the second set of one or more cameras;

use the second set of one or more images to display a pass-through image on a display of the HMD; and use the performance of the computer vision task on the first set of one or more images to cause display of a world-locked hologram on the display of the HMD in combination with the pass-through image; and when one or more detachable IR filters are selectively removed from the second set of one or more cameras of the HMD:
capture, with the second set of one or more cameras of the HMD, a third set of one or more images;
use the third set of one or more images to display a second pass-through image on the display of the HMD; and
refrain from using the performance of the computer vision task on the first set of one or more images to cause display of a world-locked hologram on the display of the HMD in combination with the second pass-through image.

\* \* \* \* \*